US008121971B2

(12) United States Patent　　(10) Patent No.:　　US 8,121,971 B2
Edwards et al.　　(45) Date of Patent:　　Feb. 21, 2012

(54) INTELLIGENT DRILLING ADVISOR

(75) Inventors: Michael L. Edwards, Houston, TX (US); Cesar A. Gongora, Katy, TX (US); Ganesh Iyer, Austin, TX (US); David McGriffy, Austin, TX (US); John McNeill, Austin, TX (US); Donald F. Shafer, Austin, TX (US); Chris Tolleson, Austin, TX (US); David Wight, Austin, TX (US)

(73) Assignee: BP Corporation North America Inc., Houston, TX (US)

( * ) Notice: Subject to any disclaimer, the term of this patent is extended or adjusted under 35 U.S.C. 154(b) by 717 days.

(21) Appl. No.: 12/261,198

(22) Filed: Oct. 30, 2008

(65) Prior Publication Data

US 2009/0132458 A1　　May 21, 2009

Related U.S. Application Data

(60) Provisional application No. 60/983,758, filed on Oct. 30, 2007, provisional application No. 61/097,128, filed on Sep. 15, 2008.

(51) Int. Cl.
*G06N 5/02*　　(2006.01)
(52) U.S. Cl. ............................................. 706/50; 706/48
(58) Field of Classification Search ........................ None
See application file for complete search history.

(56) References Cited

U.S. PATENT DOCUMENTS

| | | | |
|---|---|---|---|
| 2,670,925 A | 3/1954 | Des Champs | |
| 4,165,789 A | 8/1979 | Rogers | |
| 4,354,233 A | 10/1982 | Zhukovsky et al. | |
| 4,854,397 A | 8/1989 | Warren et al. | |
| 4,886,129 A | 12/1989 | Bourdon | |
| 5,952,569 A | 9/1999 | Jervis et al. | |
| 6,021,377 A * | 2/2000 | Dubinsky et al. | 702/9 |
| 6,026,912 A | 2/2000 | King et al. | |

(Continued)

FOREIGN PATENT DOCUMENTS

CA　　2350143 A1　　5/2000

(Continued)

OTHER PUBLICATIONS

Sheremetov et al., Fuzzy Expert System for Solving Lost Circulation Problem, Jun. 2006, Applied Soft Computing, vol. 8, pp. 14-29.*

(Continued)

*Primary Examiner* — Jeffrey A Gaffin
*Assistant Examiner* — Paulinho E Smith
(74) *Attorney, Agent, or Firm* — Barbara A. Fisher

(57) ABSTRACT

An information integration environment identifies the current drilling sites, and drilling equipment and processes at those current drilling sites. Based upon that identification, and upon data received from the drilling sites, servers access and configure software agents that are sent to a host client system at the drilling site; these software agents operate at the host client system to acquire data from sensors at the drilling site, to transmit that data to the information integration environment, and to derive the drilling state and drilling recommendations for the driller at the drilling site. These software agents include one or more rules, heuristics, or calibrations derived by the inference engine, and called by the information integration environment. In addition, the software agents sent from the information integration environment to the host client system operate to display values, trends, and reliability estimates for various drilling parameters, whether measured or calculated.

81 Claims, 17 Drawing Sheets

U.S. PATENT DOCUMENTS

| | | | |
|---|---|---|---|
| 6,142,228 | A | 11/2000 | Jogi et al. |
| 6,155,357 | A | 12/2000 | King et al. |
| 6,192,998 | B1 | 2/2001 | Pinckard |
| 6,233,498 | B1 | 5/2001 | King et al. |
| 6,234,250 | B1 | 5/2001 | Green et al. |
| 6,293,356 | B1 | 9/2001 | King et al. |
| 6,382,331 | B1 | 5/2002 | Pinckard |
| 6,405,135 | B1 | 6/2002 | Adriany et al. |
| 6,408,953 | B1 * | 6/2002 | Goldman et al. ............... 175/39 |
| 6,443,242 | B1 | 9/2002 | Newman et al. |
| 6,484,816 | B1 | 11/2002 | Koederitz |
| 6,662,110 | B1 | 12/2003 | Bargach et al. |
| 6,732,052 | B2 * | 5/2004 | Macdonald et al. .............. 702/6 |
| 6,944,547 | B2 | 9/2005 | Womer et al. |
| 6,968,909 | B2 | 11/2005 | Aldred et al. |
| 7,059,427 | B2 | 6/2006 | Power et al. |
| 7,172,037 | B2 | 2/2007 | Dashevskiy et al. |
| 7,243,735 | B2 | 7/2007 | Koederitz et al. |
| 7,480,207 | B2 * | 1/2009 | Marsh ............................. 367/83 |
| 2002/0120401 | A1 | 8/2002 | Macdonald et al. |
| 2003/0168257 | A1 | 9/2003 | Aldred et al. |
| 2003/0220742 | A1 | 11/2003 | Niedermayr et al. |
| 2004/0040746 | A1 * | 3/2004 | Niedermayr et al. ........... 175/38 |
| 2004/0065477 | A1 | 4/2004 | Paulk et al. |
| 2004/0243309 | A1 | 12/2004 | Alft et al. |
| 2004/0256152 | A1 | 12/2004 | Dashevskiy et al. |
| 2005/0149306 | A1 | 7/2005 | King |
| 2005/0161260 | A1 | 7/2005 | Koithan et al. |
| 2006/0162962 | A1 | 7/2006 | Koederitz et al. |
| 2007/0061081 | A1 | 3/2007 | Moran |
| 2007/0179768 | A1 | 8/2007 | Cullick et al. |

FOREIGN PATENT DOCUMENTS

| | | |
|---|---|---|
| EP | 1635032 A1 | 3/2006 |
| EP | 1637695 A1 | 3/2006 |
| EP | 1653044 A2 | 5/2006 |
| WO | 99/60247 | 11/1999 |
| WO | 2006/079847 A1 | 8/2006 |
| WO | 2007/073430 A1 | 6/2007 |
| WO | 2009/058635 A2 | 5/2009 |
| WO | 2009/058635 A3 | 5/2009 |

OTHER PUBLICATIONS

Sheremetov et al., "Fuzzy Expert System for Solving Lost Circulation Problem", Appl. Soft Comput. 8(1): 14-29 (2008).

Rommetveit et al., "Drilltronics: An Integrated System for Real-Time Optimization of the Drilling Process", IADC/SPE 87124 (IADC/SPE, 2004).

Mohaghegh, "Recent Developments in Application of Artificial Intelligence in Petroleum Engineering", Journal of Petroleum Technology (Apr. 2005), pp. 86-91.

Hyodo et al., Development of Expert System for Lost Circulation Problems, Proceedings of the 17th Workshop on Geothermal Reservoir Engineering (1992), pp. 147-151.

Onan et al., "Expert Systems Help Design Cementing and Acidizing OHs", Oil and Gas Journal, vol. 91, No. 16 (Apr. 19, 1993), online version.

Hayes, "Agents in a Nutshell—A Very Brief Introduction", Trans. Knowledge and Data Engineering, vol. 11, No. 1 (IEEE, Jan./Feb. 1999), pp. 127-131.

Zieba et al., "Preview and Introduction to Mobile Agents Systems in Appliance to Computer Network", TCSET 2004 (2004), pp. 438-441.

Vu et al., "Mobile Software Agents: An Overview", IEEE Communications Magazine (Jul. 1998), pp. 26-37.

Nwana, "Software Agents: An Overview", Knowledge Engineering Review 11(3):1-40 (Cambridge University Press, 1996), online version.

Preece et al., "Better Knowledge Management through Knowledge Engineering", IEEE Intelligent Systems (Jan./ Feb. 2001), pp. 36-43.

Staab et al., "Knowledge Processes and Ontologies", IEEE Intelligent Systems (Jan./Feb. 2001), pp. 26-34.

Fischer et al., "Knowledge Management: Problems, Promises, Realities, and Challenges", IEEE Intelligent Systems (Jan./Feb. 2001), pp. 60-72.

Caicedo, et al. "Unique ROP Predictor Using Bit-Specific Coefficient of Sliding Friction and Mechanical Efficiency as a Function of Confined Compressive Strength Impacts Drilling Performance", SPE International, Feb. 2005, pp. 1-19, SPE/IARC 92576.

Cohen, et al. "Drilling Optimization Utilizing Surface Instrumentation for Downhole Event Recognition, Final Report, Sep. 30, 2003 to Dec. 31, 2005," Maurer Technology, Inc., Feb. 2006.

Crichton, et al. "Command Skills for Drilling and Completion Teams: Managing the Unexpected," SPE International, Sep. 2004, pp. 1-6, SPE 89901.

Curry, et al. "Technical Limit Specific Energy—An Index to Facilitate Drilling Performance Evaluation," SPE International, Feb. 2005, pp. 1-8, SPE/IADC 92318.

Dashevskiy, et al. "Application of Neural Networks for Predictive Control in Drilling Dynamics," SPE International, Oct. 1999, SPE 56442.

Dupriest, et al. "Comprehensive Drill-Rate Management Process to Maximize Rate of Penetration," SPE International, Sep. 2006, pp. 1-9, SPE 102210.

Dupriest, et al. "Maximizing Drill Rates with Real-Time Surveillance of Mechanical Specific Energy," SPE International, Feb. 2005, pp. 1-10, SPE/IADC 92194.

Dupriest, et al. "Maximizing ROP With Real-Time Analysis of Digital Data and MSE", International Petroleum Technology Conference, Nov. 2005, pp. 1-8, IPTC 10607.

Fox, et al. "New Human-Computer Interface Concepts for Mission Operations".

Gregovic, et al. "A Common Approach to Accessing Real-Time Operations Data: Introducing Service-Oriented Architecture to E&P," SPE International, Oct. 2005, pp. 1-8, SPE 96441.

Guerrero, "Drilling Optimization with Mechanical Specific Energy," SPE Drilling Studies Group, Apr. 5, 2007.

International Search Report and the Written Opinion for International Application No. PCT/US2008/080849 dated May 6, 2009.

Koederitz, et al. "A Real-Time Implementation of MSE," American Association of Drilling Engineers, Apr. 2005, pp. 1-8, AADE-05-NTCE-66.

Pessier, et al. "Quantifying Common Drilling Problems With Mechanical Specific Energy and a Bit-Specific Coefficient of Sliding Friction," SPE International, Oct. 1992, pp. 373-388, SPE 24584.

Pickering, et al. "A Standard Real-Time Information Architecture for Drilling and Completions," SPE International, Nov. 2007, pp. 1-5, SPE 110388.

Teale "The Concept of Specific Energy in Rock Drilling," Int. J. Rock Mech. Mining Sci., vol. 2, pp. 57-73, Pergamon Press, 1965.

Waughman, et al. "Real-Time Specific Energy Monitoring Reveals Drilling Inefficiency and Enhances the Understanding of When to Pull Worn PDC Bits," International Association of Drilling Contractors and SPE International, pp. 1-14, IADC/SPE 74520.

Wolter, et al. "The First Offshore Use of an Ultrahigh-Speed Drillstring Telemetry Network Involving a Full LWD Logging Suite and Rotary-Steerable Drilling System," SPE International, Nov. 2007, pp. 1-8, SPE 110939.

* cited by examiner

INTELLIGENT DRILLING ADVISOR

CROSS-REFERENCE TO RELATED APPLICATIONS

This application claims priority, under 35 U.S.C. §119(e), of Provisional Application No. 60/983,758, filed Oct. 30, 2007, incorporated herein by this reference, and of U.S. Provisional Application No. 61/097,128, filed Sep. 15, 2008, and incorporated herein by reference.

STATEMENT REGARDING FEDERALLY SPONSORED RESEARCH OR DEVELOPMENT

Not applicable.

BACKGROUND OF THE INVENTION

This invention is in the field of the drilling of wells, and is more specifically directed to measurement and control systems for use in such drilling.

As is fundamental in the art, the drilling of wells consumes a large portion of the cost involved in the exploration for and production of oil and gas. Drilling costs have increased substantially in recent years, considering that many of the easily discovered and accessible fields in the world are already producing, if not already tapped out. As such, new wells to reach such less-accessible reservoirs are generally much deeper, and otherwise much more complex, than in years past. New wells are also often drilled at locations of reduced confidence that a producing potential reservoir is present, because of the extreme depth of the remaining reservoirs. Even when drilling into more certain hydrocarbon reservoirs, drilling costs are also often higher than in the past because of the inaccessibility of the reservoirs (e.g., at locations far offshore), or other local difficulties.

Because of these increasing costs involved in modern drilling, it is ever more critical that the drilling operation be carried out accurately and efficiently. The criticality of accurate drilling is also especially important as smaller potential reservoirs, at greater depths into the earth, are being exploited. In addition, the extreme depths to which modern wells are now being drilled add many complications to the drilling process, including the cost and effort required to address drilling problems that may occur at such extreme depths and with such increased well complexity. A very high level of skill is thus required of the driller or drilling engineer, who is the primary decision-maker at the drilling rig, in order to safely drill the well as planned. But these skills are in short supply.

On the other hand, as known in the art, a tremendous amount of information and computer processing power is available from modern computing equipment and techniques. The technology available for sensors, and for communicating and processing signals from sensors, continues to advance; in addition, modern techniques for data acquisition have also greatly improved, due in large part to the massive computing power now locally available at relatively modest cost.

By way of further background, the failure mechanism of "lost circulation" is a known concern in the drilling of an oil or gas well. As is fundamental in the art, drilling "mud" is circulated through the drill string during drilling to lubricate and perhaps power the drill bit itself, and to return cuttings to the surface; the drilling mud is cleaned to remove the cuttings and other material, and is then recycled into the drill string. Lost circulation refers to the situation in which the drilling mud is lost into the formation, rather than returning to the surface. Besides the obvious economic cost of replacing the relatively expensive drilling mud, lost circulation can also cause more catastrophic failures such as stuck drill pipe, blowout of the well, damage to the reservoir itself, and loss of the well altogether.

By way of further background, the term "software agent" is known in the art as referring to a computer software program or object that is capable of acting in a somewhat autonomous manner to carry out one or more tasks on behalf of another program or object in the system. Software agents can also have one or more other attributes, including mobility among computers in a network, the ability to cooperate and collaborate with other agents in the system, adaptability, and also specificity of function (e.g., interface agents). Some software agents are sufficiently autonomous as to be able to instantiate themselves when appropriate, and also to terminate themselves upon completion of their task.

By way of further background, the term "expert system" is known in the art as referring to a software system that is designed to emulate a human expert, typically in solving a particular problem or accomplishing a particular task. Conventional expert systems commonly operate by creating a "knowledge base" that formalizes some of the information known by human experts in the applicable field, and by codifying some type of formalism by way the information in the knowledge base applicable to a particular situation can be gathered and actions determined. Some conventional expert systems are also capable of adaptation, or "learning", from one situation to the next. Expert systems are commonly considered to in the realm of "artificial intelligence".

By way of further background, the term "knowledge base" is known in the art to refer to a specialized database for the computerized collection, organization, and retrieval of knowledge, for example in connection with an expert system.

By way of further background, the term "rules engine" is known in the art to refer to a software component that executes one or more rules in a runtime environment providing among other functions, the ability to: register, define, classify, and manage all the rules, verify consistency of rules definitions, define the relationships among different rules, and relate some of these rules to other software components that are affected or need to enforce one or more of the rules. Conventional approaches to the "reasoning" applied by such a rules engine in performing these functions involve the use of inference rules, by way of which logical consequences can be inferred from a set of asserted facts or axioms. These inference rules are commonly specified by means of an ontology language, and often a description language. Many reasoners use first-order predicate logic to perform reasoning; inference commonly proceeds by forward chaining and backward chaining.

By way of further background, the use of automated computerized system to gather measurement data from an oil or gas well during drilling, and to display trend information for those measurements at the rig location, is known. One such conventional system gathers such measurement data including bottomhole pressure, temperature, flow, torque and turn information and the like. In that conventional system, a display is generated to indicate pressure differences (i.e., differences between bottomhole pressure and formation pressure) versus drilling depth.

BRIEF SUMMARY OF THE INVENTION

It is therefore an object of this invention to provide a system, method, and a computing architecture, for harnessing the power of modern computing equipment to assist in the drilling of wellbores for the exploration and production of oil and gas, for geothermal wells, and for other purposes.

It is a further object of this invention to provide such a system, method, and architecture that can exploit previously gained knowledge about the location and behavior of subsurface strata, and previously gained knowledge about drilling equipment and processes, to optimize the drilling operation.

It is a further object of this invention to provide such a system, method, and architecture that can provide usable perception of current drilling conditions to the driller, detection and diagnosis of drilling dysfunction events, and insight into and recommendations regarding drilling conditions to be encountered, in real-time.

It is a further object of this invention to provide such a system, method, and architecture that can provide expertise to less experienced drillers, and recommendations for drilling into new fields, or using new drilling equipment, to both experienced and inexperienced drillers.

It is a further object of this invention to provide such a system, method, and architecture that adaptively adjusts its results and recommendations based on input from drilling personnel and from human experts.

It is a further object of this invention to provide such a system, method, and architecture that is responsive to human or computerized expert verification and analysis of possible results and recommendations, to maintain and improve safety and success of the drilling operations.

It is a further object of this invention to provide such a system, method, and architecture that is capable of managing multiple drilling sites at multiple drilling locations in multiple production fields, while incorporating and using applicable information gained from analogous drilling events in an adaptive manner.

It is a further object of this invention to provide such a system, method, and architecture that is capable of providing, to a decision-maker at the drilling rig, a real-time recommendation, based on surface sensor information, for avoiding or correcting for a down hole vibration event.

It is a further object of this invention to provide such a system, method, and architecture that is capable of providing, to a decision-maker at the drilling rig, a real-time recommendation, based on a combination of surface, subsurface and historical, knowledge-based sensor information, for the optimizing of the drilling of a wellbore.

It is a further object of this invention to provide such a system, method, and architecture that is capable of providing, to a decision-maker at the drilling rig, a real-time recommendation, based on a combination of surface, subsurface and historical, knowledge-based sensor information, for avoiding or correcting for a down hole vibration event.

It is a further object of this invention to provide such a system, method, and architecture that is capable of providing, to a decision-maker at the drilling rig, a real-time recommendation for avoiding or correcting for a loss of circulation of the drilling mud.

Other objects and advantages of this invention will be apparent to those of ordinary skill in the art having reference to the following specification together with its drawings.

The present invention may be implemented into an expert computer hardware and software system, implemented and operating on multiple levels, to derive and apply specific behavioral tools at a drilling site from a common knowledge base including information from multiple drilling sites, production fields, drilling equipment, and drilling environments. At a highest level, a knowledge base is developed from attributes and measurements of prior and current wells, information regarding the subsurface of the production fields into which prior and current wells have been or are being drilled, lithology models for the subsurface at or near the drilling site, and the like. In this highest level, an inference engine drives formulations (in the form of rules, heuristics, calibrations, or a combination thereof) based on the knowledge base and on current data; an interface to human expert drilling administrators is provided for verification of these rules and heuristics. These formulations pertain to drilling states and drilling operations, as well as recommendations for the driller, and also include a trendologist function that manages incoming data based on the quality of that data, such management including the amount of processing and filtering to be applied to such data, as well as the reliability level of the data and of calculations therefrom.

At a second level, an information integration environment is provided that identifies the current drilling sites, and drilling equipment and processes at those current drilling sites. Based upon that identification, and upon data received from the drilling sites, servers access and configure software agents that are sent to a host client system at the drilling site; these software agents operate at the host client system to acquire data from sensors at the drilling site, to transmit that data to the information integration environment, and to derive the drilling state and drilling recommendations for the driller at the drilling site. These software agents include one or more rules, heuristics, or calibrations derived by the inference engine, and called by the information integration environment. In addition, the software agents sent from the information integration environment to the host client system operate to display values, trends, and reliability estimates for various drilling parameters, whether measured or calculated.

The information integration environment is also operative to receive input from the driller via the host client system, and to act as a knowledge base server to forward those inputs and other results to the knowledge base and the inference engine, with verification or input from the drilling administrators as appropriate.

According to another aspect of this invention, the system includes the capability of creating a notional "best well" from all available information for the production field. The information on which this "best well" is created includes depth and time based values, and drilling history including driller reaction, to encapsulate rules about how to drill an optimal well, including reaction prior to a dysfunction. These rules can indicate the actions to be taken to drill such a "best well", operational recommendations including when to operate near the maximum operating parameters of the drilling rig, and displayable rationale for recommended actions ahead of the driller's perception of an impending down hole vibration event.

According to another aspect of the invention, the system develops a knowledge base from attributes and measurements of prior and current wells, and from information regarding the subsurface of the production fields into which prior and current wells have been or are being drilled. According to this aspect of the invention, the system self-organizes and validates historic, real time, and/or near real time depth or time based measurement data, including information pertaining to drilling dynamics, earth properties, drilling processes and driller reactions. These data and information are used to create the rules for drilling a notional "best well". This drilling knowledge base suggests solutions to problems based on feedback provided by human experts, learns from experience, represents knowledge, instantiates automated reasoning and argumentation for embodying best drilling practices into the "best well".

According to another aspect of the invention, the system includes the capability of virtualizing information from a well being drilled into a collection of metalayers, such metalayers corresponding to a collection of physical information about the layer (material properties, depths at a particular location, and the like) and also information on how to successfully drill through such a layer, such metalayers re-associating as additional knowledge is acquired, to manage real-time feedback values in optimizing the drilling operation, and in optimizing the driller response to dysfunction. Normalization of the "best well" into a continuum, using a system of such metalayers, enables real-time reaction to predicted downhole changes that are identified from sensor readings.

According to another aspect of the invention, the system is capable of carrying out these functions by creating and managing a network of software agents that interact with the drilling environment to collect and organize information for the knowledge base, and to deliver that information to the knowledge base. The software agents in this network are persistent, autonomous, goal-directed, sociable, reactive, non-prescriptive, adaptive, heuristic, distributed, mobile and self-organizing agents for directing the driller toward drilling optimization, for collecting data and information for creating the "best well", and for creating dynamic transitional triggers for metalayer instantiation. These software entities interact with their environment through an adaptive rule-base to intelligently collect, deliver, adapt and organize information for the drilling knowledge base. According to this aspect of the invention, the software agents are created, modified and destroyed as needed based on the situation at the drilling rig, within the field or at any feasible knowledge collection point or time instance within the control scope of any active agent.

According to another aspect of the invention, the software agents in the network of agents are controlled by the system to provide the recommendations to the drillers, using one or more rules, heuristics, and calibrations derived from the knowledge base and current sensor signals from the drilling site, and as such in a situationally aware manner. In this regard, the software agents interact among multiple software servers and hardware states in order to provide recommendations that assist human drillers in the drilling of a borehole into the earth at a safely maximized drilling rate. The software "experts" dispatch agents, initiate transport of remote memory resources, and provide transport of knowledge base components including rules, heuristics, and calibrations according to which a drilling state or drilling recommendation is identified responsive to sensed drilling conditions in combination with a selected parameter that is indicative of a metalayer of the earth, and in combination with selected minimums and maximums of the drilling equipment sensor parameters. The software experts develop rules, heuristics, and calibrations applicable to the drilling site derived from the knowledge base that are transmitted via an agent to a drilling advisor application, located at the drilling site, that is coupled to receive signals from multiple sensors at the drilling site, and also to one or more servers that configure and service multiple software agents.

According to another aspect of the invention, the system is applied to circulation actors to optimize circulation, hydraulics at the drill bit point of contact with the medium being drilled, rationalization of distributed pressure and temperature measurements and to provide recommendations to avoid or recover from loss of circulation events.

In addition, while this invention is summarized in connection with a multiple level hardware and software architecture system, in combination with drilling equipment and human operators, it is contemplated that several portions and facets of this invention are separately and independently inventive and beneficial, whether implemented in this overall system environment or if implemented on a stand-alone basis or in other system architectures and environments. Those skilled in the art having reference to this specification are thus directed to consider this description in such a light.

DETAILED DESCRIPTION OF THE INVENTION

The present invention will be described in connection with its preferred embodiment, namely as implemented into a situationally-aware distributed hardware and software architecture in communication with operating drilling rigs, because it is contemplated that this invention is especially beneficial when implemented in such an environment. However, it is also contemplated that this invention may provide substantial benefits when implemented in systems according to other architectures, and that some or all of the benefits of this invention may be applicable in other applications. For example, while these embodiments of the invention will be described in connection with wells used for oil and gas exploration and production, this invention is also contemplated to be applicable in connection with other wells, such as geothermal wells, disposal wells, injection wells, and many other types of wells. Accordingly, it is to be understood that the following description is provided by way of example only, and is not intended to limit the true scope of this invention as may be claimed herein or in subsequent patents and applications claiming priority to this application.

The preferred embodiments of this invention will be described in connection with the managing and assisting of the drilling of wellbores into the earth, for the exploration, development, and production of hydrocarbons (i.e., oil, gas, etc.), and by way of examples in connection with optimizing the drilling operation, and with managing reaction to vibration and lost circulation events in such wellbores. As will become evident from the following description, these preferred embodiments of the invention provide an automated "expert" system that utilizes a body of previously obtained information, and rules, heuristics, and calibrations generated from that body of knowledge, to perceive current and past conditions of the drilling operation, to comprehend the state of the drilling operation based on the perceived conditions, and to project future results of the drilling operation, based upon which recommendations may be made to the driller and other personnel at the drilling site.

Context of the Invention

Figure 1:
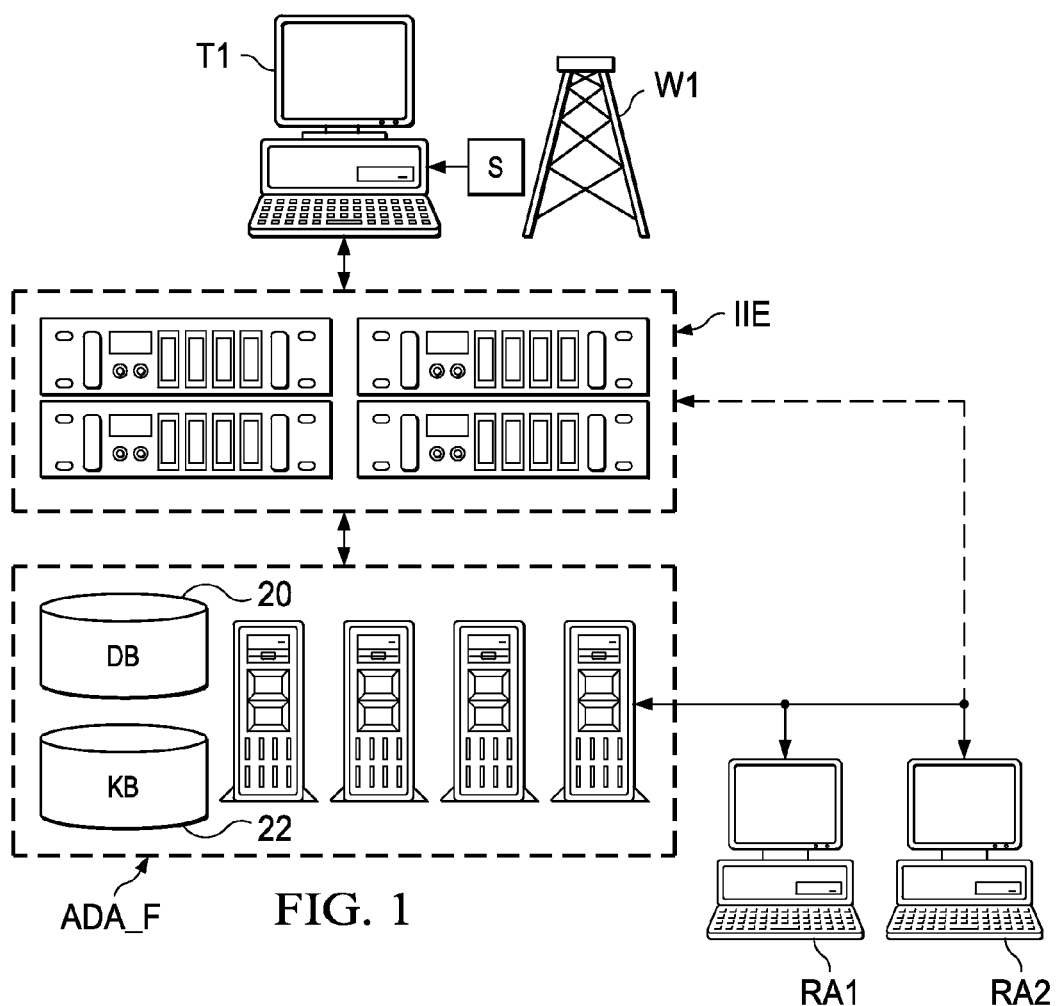
FIG. 1 is a schematic diagram of a system constructed and operating according to embodiments of the invention.

FIG. 1 illustrates the contextual arrangement of a preferred embodiment of this invention, in connection with a single drilling rig W1. Drilling rig W1 is a conventional drilling rig, with conventional drilling equipment, as useful for the drilling of an oil well or gas well into the earth. Examples of such conventional drilling rigs suitable for use in connection with this preferred embodiment of the invention include, without limitation, hydraulic rigs, percussion rigs, air-drilling rigs, alternating-current (AC) rigs, and modifications thereof. As is typical for modern drilling rigs, several sensors S are implemented at drilling rig W1 for measuring various parameters useful in connection with the drilling of such a well. These sensors S include pressure sensors, mechanical sensors (for sensing rotation, position, velocity, acceleration, etc.), temperature sensors, flow sensors, etc. According to this embodiment of the invention, these sensors S are in communication with rig client computer system T1, for example by way of a data acquisition card or subsystem (not shown), which typically includes an analog-to-digital converter (ADC) function.

According to this embodiment of the invention, rig client T1 is deployed at the site of drilling rig W1. Rig client T1 provides the driller with visual indicators in various formats corresponding to current conditions at drilling rig W1, as based on signals from sensors S and computations as may be carried out by rig client T1 itself. In addition, as will be described in further detail below, rig client T1 is capable of determining and displaying trends in these various measurements, based on rules and heuristics that are defined by the overall system of this invention, as well as determining and displaying recommendations derived according to such rules, heuristics, and calibrations, suggesting actions to the driller in operating drilling rig W1. Rig client T1 is also capable of receiving inputs from the driller in response to its indicated trends and recommendations, for example by way of a human-machine interface (HMI), and input devices such as a touchscreen, keyboard, and mouse.

In the context of this invention, rig client T1 is connected over a conventional communications link to an information integration environment IIE. As will be described below in further detail, the information integration environment IIE manages software "agents" that are sent to and executed on rig client T1, specifically configured for drilling rig W1, in the computations and input/output functions provided by rig client T1 to the driller on site at drilling rig W1. In addition, information integration environment IIE requests and receives data corresponding to the output of sensors S and corresponding to driller input into rig client T1, so that this data can be used in the reformulation of existing rules and heuristics, and in the formulation of new rules and heuristics, as will be described in further detail below.

Figure 2:
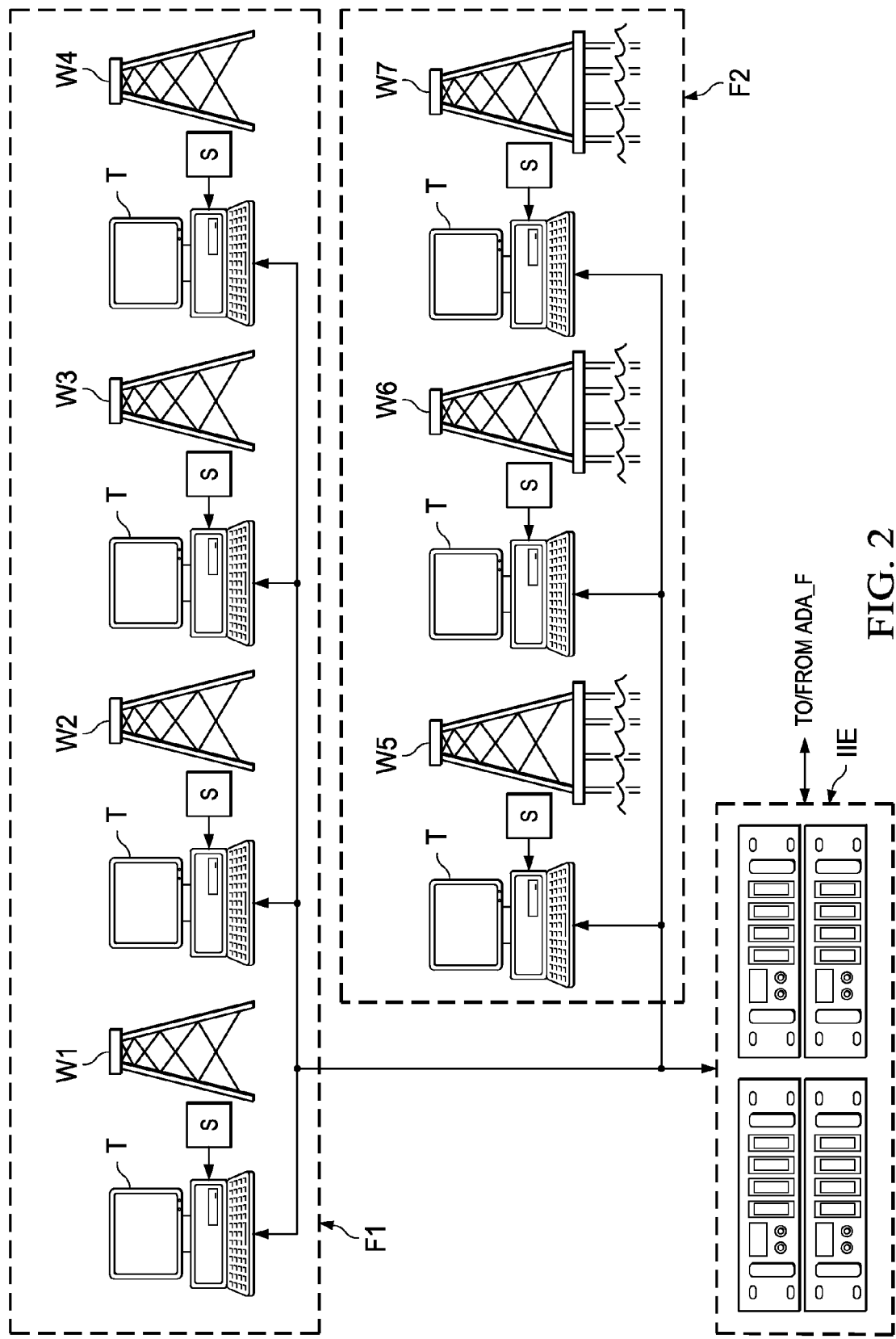
FIG. 2 is a schematic diagram illustrating the implementation of embodiments of the invention in connection with multiple production fields.

FIG. 2 illustrates that information integration environment IIE manages software agents deployed over multiple drilling rigs W, each with a corresponding rig client T, in multiple production fields F. In the example shown in FIG. 2, terrestrial production field F1 includes multiple drilling rigs W1 through W4, and off-shore production field F2 includes multiple off-shore drilling rigs W5 through W7. Of course, it is contemplated that many more drilling rigs W per production field F, and many more production fields F, than shown in FIG. 2 can be managed by an installation of information integration environment IIE. FIG. 2 illustrates that information integration environment IIE can manage these multiple clients at multiple drilling rigs W and fields F, and that information integration environment IIE can also select the software agents to be sent to and executed by each rig client T according to its particular drilling rig W (to include rules, heuristics, and calibrations specific to that drilling rig W), and according to its production field F (to include rules, heuristics, and calibrations common to all rigs W at field F).

Referring back to FIG. 1, in the context of the preferred embodiments of this invention, in the direction further upstream from wells W, information integration environment IIE is in communication with advanced drilling advisor formulator ADA_F. Advanced drilling advisor formulator ADA_F corresponds to a remote computing function by way of which formulations to be used in connection with the monitoring and advising of the driller via information integration environment IIE and rig clients T are formulated. For purposes of this description, the term "formulations" will refer to protocols or criteria according to which the system makes determinations (e.g., drilling state, parameter estimates, etc.) and decisions (e.g., recommendations) regarding the drilling operation. Examples of formulations include rules or rule sets, such as logical or arithmetic formulae that return an inference based on parameter values, heuristics, referring to less-rigid automated techniques (as compared with rule sets) for returning an estimate or drawing an inference using a trial-and-error or some other less-than-rigorous decision process, and calibrations, by way of which measurements from various sensors S can be correlated or normalized with one another. Accordingly, formulator ADA_F includes large data base memory resources, and substantial computing power for deriving rule sets, heuristics, calibrations, adaptive networks ("neural nets"), and other so-called "artificial intelligence" relationships to be incorporated into software agents forwarded by information integration environment IIE to rig clients T, and executed at rig clients T. In addition, according to the preferred embodiment of the invention, formulator ADA_F operates an automated trendologist, by way of which sensor data from multiple data sources forwarded from drilling rigs W by information integration environment IIE can be intelligently processed and combined, with the processing dependent on the nature and quality of the data itself, and so that displays of these trends can be derived by rig clients T and displayed by rig clients T in the most useful manner for the human drillers on site. According to an embodiment of the invention, the processing of data from the various data sources is carried out by data grinder functions that apply low-pass filters and other processes to the sensor data, of a function and complexity selected for each data source according to formulations derived by software experts, in response to the nature of the data, and its expected and actual quality.

Formulator ADA_F is coupled to one or more remote administrators RA1, RA2, etc., as shown in FIG. 1. Remote administrators RA1, RA2 represent remote desktops or computers (i.e., human-machine interfaces, or HMIs) that can communicate with formulator ADA_F, and that have the computational and communicative capability appropriate to allow a human drilling expert to review new, modified, or potential rules, heuristics, and calibrations formulated by formulator ADA_F. This review of these rules, heuristics, and calibrations allows inputs from a human drilling expert to verify or veto a proposed rule set or individual rules within a rule set, whether new or modified, based on actual drilling experience. In addition, remote administrators RA1, RA2 may access formulator ADA_F to carry out management and monitoring functions regarding the system. Remote administrators RA1, RA2 can also optionally communicate with information integration environment IIE, so that the human drilling experts can monitor the state of any one of drilling rigs W, or indeed mirror the display at the corresponding selected rig client T for that drilling rig. Furthermore, remote administrators RA1, RA2 may, assuming proper security levels are granted, modify the configuration parameters for a given drilling rig W, or select different rules, heuristics, or calibrations to be applied to a particular drilling rig W.

Construction of the Preferred Embodiment of the Invention

The construction of an intelligent drilling advisor system according to an embodiment of this invention will now be described. This particular embodiment of the invention is contemplated to provide those of ordinary skill with a useful example of the implementation of this invention in sufficient detail that those readers can readily realize this invention in a wide range of situations and applications without undue experimentation. It is to be understood, however, that the embodiment of the invention described in this specification is provided by way of example only, and is not to be interpreted as limiting the scope of the invention as hereinafter claimed.

According to this embodiment of the invention, as discussed above relative to FIGS. 1 and 2, and as will be apparent from the following description, the system of this embodiment of the invention is arranged in a client-server architecture. Each rig client T may be implemented in the form of a "thin client" or alternatively as a "fat client". As known in the art, a "fat client" computer provides substantial functionality to its user independently from the central server or servers, while a "thin client" does little processing itself, but rather relies on accesses to the central server or servers, which perform the bulk of the processing. In either case, rig client T includes sufficient computational capacity to receive and process incoming digital data from the data acquisition system, preferably using a conventional data acquisition application running on rig client T, and also to receive and execute software agents forwarded to it from information integration environment IIE. In this regard, considering the system according to this embodiment as a client/server architecture, information integration environment IIE operates as the central server or servers for rig clients T.

As known in the art, the term software "agent" refers to a component of software that is capable of acting in a defined manner to accomplish a task on behalf of a user. Agents are often characterized according to their attributes describing their capability. For example, some software agents are static, in that they reside only on one computer within a network, while other software agents are mobile, capable of moving themselves among computers and among applications within the network (e.g., from server to client, or vice versa). Agents can also be classified as either deliberative or reactive: deliberative agents possess some sort of internal "reasoning" model according to which they plan and execute coordination with other agents, while the behavior of reactive agents follows a stimulus-response approach. Autonomous agents are capable of operating on their own, without requiring guidance or direction from a human user, in effect operating proactively; this autonomy often includes the capability of self-termination by an agent once its tasks are complete. Cooperative agents are capable of interacting with other agents to communicate data and results, and to coordinate their individual actions within a larger framework. Adaptive agents react to their external environment to adapt their behavior in response to input data and calculations or determinations. According to this embodiment of the invention, as will become apparent from the following description, the distributed software agents operating in the overall system, including those agents executed at rig clients T, are autonomous, cooperative, adaptive, mobile, and reactive software agents. These agents include goal-directed and persistent agents, cooperative with other agents to the extent of being able to self-organize into a network of agents. The overall function of these agents will be to interact with the drilling environment, and formulations (e.g., rules, heuristics, calibrations) that have been previously developed, in order to intelligently collect, deliver, adapt, and organize information about the drilling operation.

As shown in FIGS. 1 and 2, sensors S are provided at drilling rig W in the conventional manner. Some sensors S are provided at the surface, and others are provided sub-surface, at the site of drilling rig W. Examples of the instantaneous measurements acquired by sensors S and utilized according to this embodiment of the invention include, among others:

weight-on-bit (WOB);
revolutions per minute (RPM) of the drill bit;
torque applied at the top of the drill string;
standpipe pressure;
mud pump output.

In addition, it is contemplated that other sensors S may correspond to pressure, stress, and temperature measurements, such as those obtained by direct drill string sensors, and logging measurements, such as those obtained by way of measurement-while-drilling (MWD) technologies, as well known in the art. As will be described below, software agents and other functions within the system will calculate averages and other statistics from these measurements. These statistics may be reflected as real-time (instantaneous) values of the various parameters, or may be running averages over one or more elapsed periods of time. In addition, according to this embodiment of the invention, "reliability" ratings are computed or otherwise derived from the measurement data by software agents. These reliability ratings for a particular sensor or other data source can be used in determining the extent of processing to be applied to the measurement data.

Many of sensors S present their output signals in the analog domain. These analog output signals from sensors S are collected by way of a conventional data acquisition system (not shown), which includes an analog-to-digital conversion (ADC) function in this embodiment of the invention, to enable digital data analysis as will be described. According to this embodiment of the invention, these measurement data from the data acquisition system are acquired through the action of software agents instantiated in the system, which are executed at rig client T to poll or to receive "pushed" measurements from the data acquisition system at its drilling rig W. Some of these software agents may obtain the sensor measurement data periodically, at a default or selected frequency; other software agents may be instantiated and execute in a "situationally aware" manner, in response to the system determining, by way of one or more formulations derived by software experts, that the operation at drilling rig W is in a particular drilling state or condition.

Figure 3:
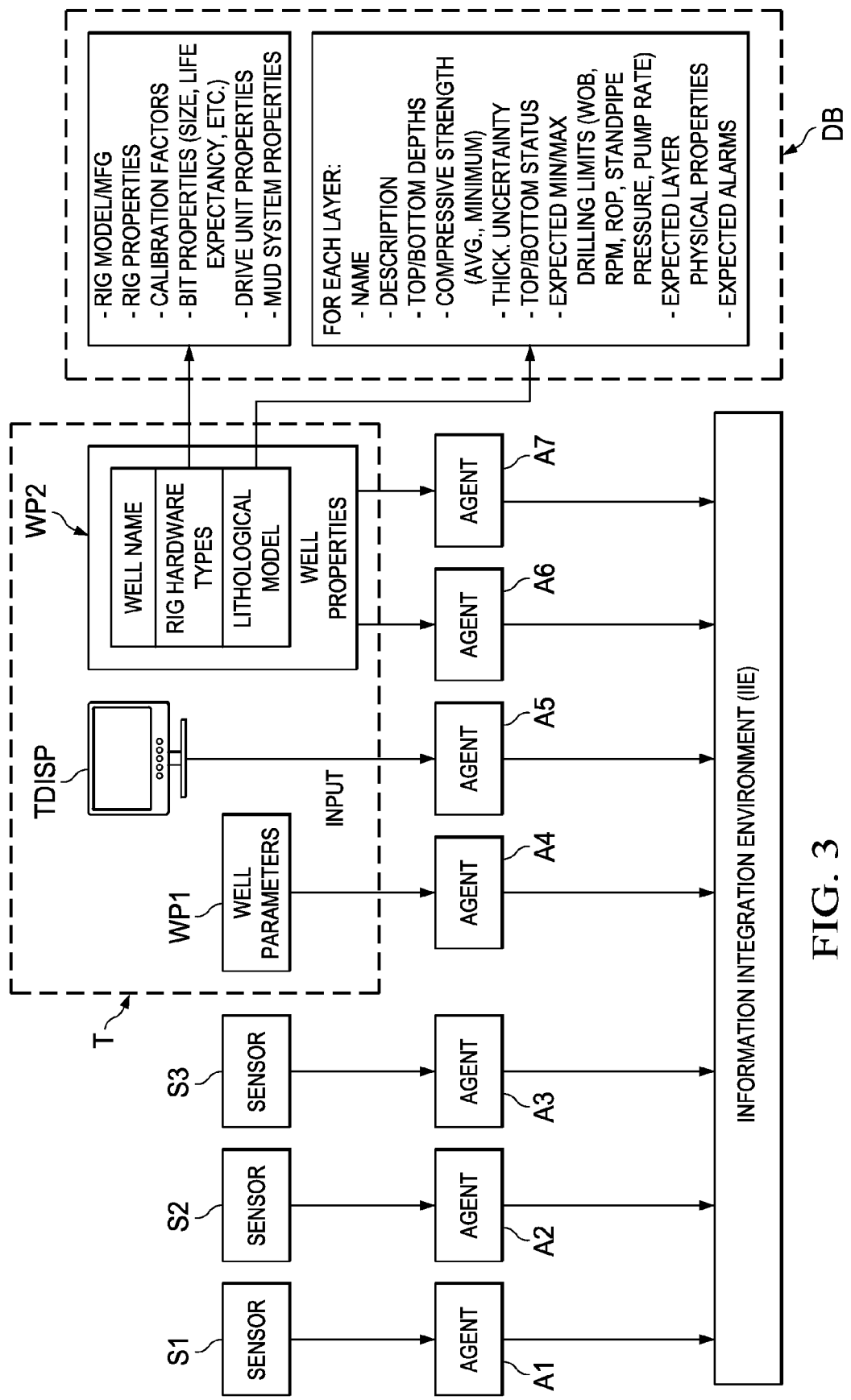
FIG. 3 is a schematic diagram illustrating functions at a drilling rig and their communication of information from the drilling rig to an information integration environment, according to an embodiment of the invention.

FIG. 3 illustrates part of the data flow from a drilling rig W to information integration environment IIE, according to this agent-based approach. Sensors S1 through S3 represent some of the sensors at drilling rig W itself. Measurements from those sensors S1 through S3 are obtained (in the physical sense, via the data acquisition system, A/D conversion, buffering, etc.) by corresponding software agents A1 through A3, respectively. As discussed above, agents A1 through A3 are instantiated by information integration environment IIE, and are typically executed at or through client T, to acquire measurement data from their corresponding sensors S1 through S3 on a periodic basis, or on a situationally-aware basis in response to previously sensed conditions or intelligently determined drilling states. Of course, it is contemplated that many more than three sensors S and corresponding data acquisition agents A will be deployed for a given drilling rig W1 within a typical drilling operation.

For example, U.S. Provisional Application No. 61/097,128 filed Sep. 15, 2008, incorporated herein by reference, describes the distributed deployment of multiple sensors along the length of the drill string, rather than only at the surface and in the bottomhole assembly as conventional. For example, these sensors may be deployed in subs along the drill string at which signal repeaters (for signals transmitted from the bottomhole assembly to the surface) are placed. These multiple sensors provide real-time measurements from locations that are distributed along the drill string, both during drilling or while the drill string is stationary. Examples of parameters measured in this distributed manner include borehole measurements such as pressure and temperature, and rheological properties or states of the drilling fluid or borehole, such as temperature, viscosity, flow rate, shear rate, depth, and the like.

The measurement data are communicated from these distributed sensors to a computer system at the surface. Processing of these distributed measurements, along with the bottomhole and surface measurements, provide a great deal of additional insight into the optimization of the drilling process, and also into diagnosis and corrective action for drilling or circulation dysfunctions. For example, anomalous measurement values along the length of the drill string, and the location of those anomalies, can be detected from these distributed measurements—such anomalies can only be detected indirectly or inferentially, if at all, by conventional bottomhole and surface sensors. Furthermore, these distributed measurements can provide real-time profiles of the measured parameters over time and depth, and these profiles can be themselves processed to detect changes in those measurement profiles over time and over depth. It is contemplated that this approach of distributed measurement will be especially valuable when incorporated into the intelligent drilling advisor system and method of this embodiment of the invention. As such, it is contemplated that sensors S may be deployed at drilling rig W1 at the surface, in a bottomhole assembly, and also in a distributed manner along the length of the drill string, according to these embodiments of the invention.

As shown in FIG. 3, rig client T also preferably includes touchscreen display TDISP, by way of which a human machine interface (HMI) software agent presents certain current measurements and calculation results, trends of those measurements and calculations, indications of the current state of the drilling operation for its associated drilling rig W, and also recommendations of drilling actions to be taken as derived by the applicable rules, heuristics, and calibrations according to which one or more of the software agents operate. If the display is a touchscreen, as is preferred, the drilling decision-maker (i.e., the driller at land-based drilling rigs W, and the drilling engineer at offshore drilling locations) can enter inputs to rig client T in response to the displayed recommendation. An important type of such inputs is an "ignore" input, by way of which the drilling decision-maker indicates a decision to decline following the recommendation, as will be described in further detail below. Typically, touchscreen display TDISP at which the recommendations are displayed to the drilling decision-maker will be physically located at drilling rig W; alternatively, or additionally (i.e., if multiple displays TDISP are supported), touchscreen display TDISP or another type of HMI may be deployed at a location remote from drilling rig W, with telephone, radio, or other communications being carried out between the remote drilling decision-maker and personnel at drilling rig W that are physically carrying out the recommendation or other instructions. Other input devices (keyboard, mouse, etc.) beyond touchscreen display TDISP are also preferably deployed with rig client T. These measurements and inputs are acquired and forwarded by the agents executed at each rig client T (e.g., agent A5 shown in FIG. 3) to information integration environment IIE.

In addition, various data regarding the drilling equipment deployed at drilling rig W are also stored at rig client T, and forwarded to information integration environment IIE by way of software agents (e.g., agents A4, A6, A7 of FIG. 3). These data include various attributes of the well being drilled, including a name for the well, a text description of the well, projected completion depth of the well, cost parameters (fixed and variable costs), and links to the lists of the rig hardware types deployed at drilling rig W and of the layers (lithology) through which the well is being drilled, as will now be described relative to FIG. 3.

Among these well properties, the projected completion depth is a parameter that can be applied to formulations (rules, heuristics, and calibrations). This and other such parameters WP1 stored within client T can be acquired by a corresponding software agent A4, and forwarded to information integration environment IIE.

Other well properties WP2 serve as a key by way of which other objects can be obtained. These properties are in the form of a "root" object that links to the types of hardware at drilling rig W, lithological models pertinent to the location of drilling rig W, and the like. Rig hardware types stored at rig client T are not themselves referenced directly by rules, but rather provide keys to tables or other data stores, for example in a database DB at formulator ADA_F (FIG. 1), from which properties of the particular rig hardware can be retrieved. As shown in FIG. 3, rig hardware type values stored as well properties WP2 at client T access a table or object in database DB storing identifying information regarding the rig, including the rig manufacturer and model, drive unit manufacturer and model, the control system manufacturer and model, the number of pumps, pump manufacturers and models, mud system manufacturer and model, drill bit manufacturer and model, and various calibration factors derived from the rig properties. These properties WP2 can also point to tables or objects storing the information regarding these various hardware features. For the case of the drill bit, this information can include the specific current bit being used (e.g., serial number), its size, expected remaining life, and its cutting properties. Other similar information regarding the rig stored in database DB and retrievable by way of a key within well properties WP2 stored at client T include operational limits, such as maximum weight-on-bit (WOB), maximum RPM for the rig, maximum surface torque, maximum standpipe pressure, maximum pump output, horsepower of the drawworks, and the like. As mentioned above, calibration factors may be stored at database DB, by way of which measurement data from sensors S can be adjusted during operation.

According to this embodiment of the invention, each drilling rig W is also preferably associated with a lithological model that indicates the expected sequence of lithological layers (e.g., from five to twenty layers) to be encountered in the drilling operation. In this embodiment of the invention, well properties WP2 stored at client T also include a key or link to such a model for the well being drilled from drilling rig W1, in this example. Within that lithological model, also stored at a database DB, for example within formulator ADA_F or elsewhere in the network, data are stored for each layer in the corresponding model that indicate its particular characteristics. The following table lists an example of such layer-specific property data, by way of example:

| Property | Type (units) |
|---|---|
| Layer name | Text |
| Layer description | Text |
| Depth of top of layer | Real (ft.) |
| Depth of bottom of layer | Real (ft.) |
| Average compressive strength | Real (Kpsi) |
| Layer top status (estimated or actual) | Boolean |
| Layer bottom status (estimated or actual) | Boolean |
| Thickness uncertainty (zone of uncertainty at bottom of layer) | Real (ft.) |

The lithological model also can include expected values of drilling parameters that will be encountered within each layer, for example:

| Expected values | Type (units) |
|---|---|
| Expected min/max WOB | Real (Kpsi) |
| Expected min/max RPM | Real (RPM) |
| Expected min/max rate of penetration (ROP) | Real (ft./sec.) |
| Expected min/max standpipe pressure | Real (psi) |
| Expected min/max pump rate | Real (flow unit) |
| Expected min/max compressive strength | Real (Kpsi) |

As shown in FIG. 3, the lithological model can also include calculated estimated limits for these drilling parameters, as derived from the rig properties (hardware types) or as otherwise may be calculated:

| Limits | Type (units) |
|---|---|
| Maximum WOB limit | Real (Kpsi) |
| Maximum RPM limit | Real (RPM) |
| Maximum rate of penetration (ROP) limit | Real (ft./sec.) |
| Maximum standpipe pressure limit | Real (psi) |
| Maximum pump rate limit | Real (flow unit) |
| Maximum WOB limit near bottom of layer | Real (Kpsi) |
| Maximum RPM limit near bottom of layer | Real (RPM) |
| Maximum ROP limit near bottom of layer | Real (ft./sec.) |

The lithological model stored in database DB also preferably includes expected physical properties. These expected physical properties and layer behavior can be expressed qualitatively (on a scale of from 0 to 5, from least-to-most, for example):

| Physical property |
|---|
| Expected abrasiveness |
| Expected porosity |
| Expected permeability |
| Expected propensity for bit balling |
| Expected propensity for bottom balling |
| Expected propensity for stick-slip vibration |
| Expectation of embedded soft layers |
| Expectation of embedded hard layers |
| Expected propensity for well control problems |

As shown in FIG. 3, these keys or links stored at client T as well properties WP2 can be acquired by corresponding software agents A6, A7, and forwarded to information integration environment IIE for retrieval from database DB within formulator ADA_F or elsewhere. Indeed, it is contemplated that the rig hardware data and the lithological model itself may alternatively be stored within information integration environment IIE, and called or linked to by rig identifying information stored at rig client T and forwarded to information integration environment IIE by agents A6, A7.

From a hardware standpoint, it is contemplated that information integration environment IIE is preferably configured as a conventional server architecture, with one or more server computers (e.g., a bank of rack-mounted servers, accessible via one or more high-performance laptop or desktop computers) serving as the physical servers in the overall network. The physical locations of these physical server computers may also be distributed among data centers, or among production fields, or the like, as may be supported by the network infrastructure in place. As known in the art, a conventional server architecture is substantially a passive system, in that it operates in a request-acknowledge fashion relative to its clients (e.g., rig clients T). In addition, although operating as a server, information integration environment IIE may also itself execute various software agents, for example to request data from rig clients T, or to access formulator ADA_F. as will be described in further detail below.

As evident from FIG. 2, information integration environment IIE is in communication with many rig clients T, at various locations such as production fields F. It is contemplated that the particular communications links can be realized by way of any one or more than one communications technologies, including dedicated or private wired or wireless LAN, MAN, or WAN networks, conventional Internet protocol (IP) over wired or wireless physical communications links either public or by way of a virtual private network (VPN), satellite communications, etc. It is contemplated that the particular communications technology and physical coupling of rig clients T and information integration environment IIE, as well as between information integration environment IIE and formulator ADA_F, and to and from remote administrators RA, according to one or a combination of these approaches, can be readily implemented by those skilled in the art having reference to this specification.

Figure 4:
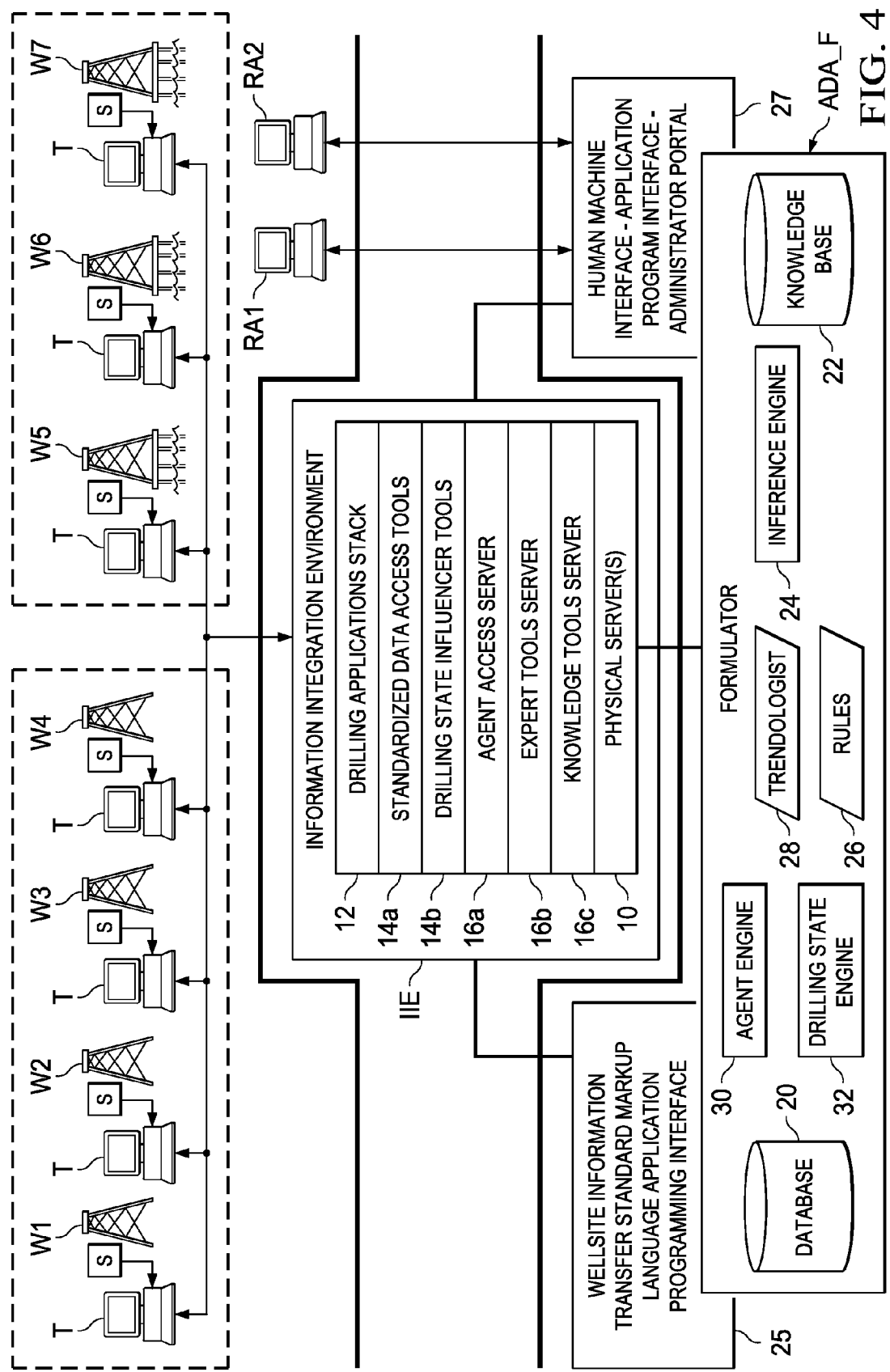
FIG. 4 is a schematic diagram illustrating the arrangement of various computational resources within an information integration environment and a formulator, according to an embodiment of the invention, and the relationship of those resources to a drilling rig in that embodiment of the invention.

From a software standpoint, according to this embodiment of the invention, the software executed and executable by information integration environment IIE is arranged as a "stack" of drilling applications. FIG. 4 illustrates the software architecture of information integration environment IIE and of formulator ADA_F, according to this embodiment of the invention. As shown in FIG. 4, information integration environment IIE is supported by one or more physical servers 10, at one or more physical locations as described above. Physical servers 10 support and execute the stack of drilling applications, which includes data access tools 14 and also multiple logical servers 16.

Data access tools 14 operate to request and process data from sensors S for each of the operating drilling rigs W. These data access tools 14 include standardized data access tools 14a, which refer software applications required to receive data in various formats (e.g., WITSML, LAS, CSV, WITS format data) via software agents and other such applications. In this regard, the term "standardized" in connection with standardized data access tools 14a refers to the multiple standardized formats in which these data are imported, rather than referring to any standardization in the tools themselves; rather, as will be apparent from this specification, these standardized data access tools 14a involve new and unique approaches to the receipt and processing of these data. For example, as will be described in further detail below, standardized data access tools 14a implement data feeds directly to data "grinder" functions located at rig clients T. These data grinder functions process the data acquired by data acquisition software agents executed at clients T, with the level of processing (e.g., filtering) dependent on the quality of the data received, as determined by rules, heuristics, and calibrations derived by formulator ADA_F. These data grinder functions produce filtered data, from the various data sources, that are then combined and formatted for display and for use in creating drilling recommendations, updated or new formulations, and the like by a "trendologist" function within formulator ADA_F.

It is contemplated that measurement data and other information will be provided not only from various equipment and computer systems, but also from various entities, including the leaseholder of the oil or gas production field (i.e., the "oil company"), drilling contractors, and other oilfield service companies. For example, the oil company will provide information regarding the production levels and downstream pipeline infrastructure, as well as other well planning intelligence. The drilling contractor will provide information regarding its infrastructure, including information related to the subsea support systems and vessel management, power management, safety management, and the like. Service companies provide information including logging-while-drilling (LWD) measurements, measurement-while-drilling (MWD) data, marine management factors, and information regarding such other operations as directional drilling parameters and constraints, and completion and cementing parameters. This information from these various entities influence the situational awareness determinations that are deduced by the system according to this invention. As such, drilling applications stack 12 also includes drilling state influencer tools 14b within information integration environment IIE interface data received from these various data providing "entities", or sources. It is contemplated that these drilling state influencer tools 14b can also incorporate various data processing operations.

In addition to these data access tools 14a, various logical servers 16 are also included within information integration environment IIE, specifically within drilling applications stack 12 embodied within information integration environment IIE, and executed by the one or more physical servers 10 at that level. As mentioned above, logical servers 16 may be realized by server applications being executed on individual physical server computers 10, or as distributed server applications operating on one or more physical server computers 10; it is contemplated that those skilled in the art having reference to this description will be able to readily implement these and other logical servers that are useful in realizing information integration environment IIE according to the preferred embodiment of the invention.

Agent access server 16a refers to a server application by way of which various software agents executed by rig clients T, and by information integration environment IIE itself, are selected and configured for the particular computer that is to execute that software agent, and by way of which, once an agent is selected, that agent instantiated and forwarded to the corresponding rig clients T. As will be described in further detail below, these agents (e.g., agents A1 through A7 of FIG. 3) can be dispatched by agent access server 16a in a situationally-aware manner, depending on the particular stage in the drilling operation at each drilling rig W1 and its current drilling state, as may be deduced by formulator ADA_F.

Expert tools server 16b, also operating as part of information integration environment IIE, configures and instantiates software agents that acquire data useful for the development of formulations (rules, heuristics, and calibrations), and the updating of previously derived formulations. It is contemplated that these formulations can include "tool kits" of rules, heuristics, and calibrations that are tailored to each of drilling rigs W served by this system, and the fields F in which they are being deployed. In this embodiment of the invention, expert tools server 16b instantiates those agents in response to directives from formulator ADA_F, and in a non-real-time basis, considering that the derivation of new or revised formulations is contemplated to not be a real-time exercise. In this manner, agents can be instantiated by expert tools server 16b at such time as convenient for clients T, thus avoiding resource conflicts with essential real-time processes, or with agents instantiated by agent access server 16a. Upon creation or updating of these formulations, by formulator ADA_F, the tool kits including the rules, heuristics, and calibrations appropriate for a given rig client T and its well W are then made available to later-configured software agents.

Knowledge tools server 16c is another logical server operating within information integration environment IIE according to this preferred embodiment of the invention. Knowledge tools server 16c provides packages of formulations (rules, heuristics, and calibrations) corresponding to a notional "best well" model for each specific drilling rig W. This "best well" model includes rules, heuristics, and calibrations for "how" to drill the optimum well at the location of each specific drilling rig W. According to this embodiment of the invention, the optimum well is optimal in a situational sense, such that the applicable rules, heuristics, and calibrations can themselves determine the optimization criteria, for current and expected drilling conditions. These rules, heuristics, and calibrations are based on the entirety of information and intelligence available to formulator ADA_F, including well parameters and well properties for the specific well, along with knowledge gained from other wells including responses of drillers to recommendations, performance of other wells, information from drilling state influencers acquired by drilling state influencer tools 14b, and the like. In addition, human experts can provide input into these notional "best wells" via remote administrators RA, via human machine interface (HMI) API portal 27 at formulator ADA_F. The "best well" configurations provided by knowledge tools server 16c include the rules, heuristics, and calibrations corresponding to the "best well" model, and are configured into one or more software agents that are "pushed" to rig clients T for the various drilling rigs W; those pushed software agents are then capable of receiving the sensed measurement data from sensors S at the drilling site and, using the formulations provided by knowledge tools server 16c in the "best well" configuration, provide the driller or drilling engineer with drilling recommendations. It is contemplated that these recommendations include recommendations on how to achieve optimal drilling results, recommendations to maximize one or more operating parameters of the hardware, and also recommendations with rationale on actions to be taken by the driller to avoid impending undesirable events (vibration, sticking, low of circulation fluids, well control, etc.). As mentioned above, these recommendations are displayed at rig clients T, and the responses from the driller, for example both "ignore" and "accept" inputs from the driller in response to a recommendation, are also processed and forwarded to formulator ADA_F (along with other measurements) for the derivation of new inferences, and thus updated formulations.

According to this embodiment of the invention, the "best well" configuration for a given drilling rig W, provided by knowledge tools server 16c, is a virtualization of information regarding the subsurface at the location of that rig W. In this embodiment of the invention, this virtualized information is arranged as a collection of "metalayers", each metalayer corresponding to an abstraction of a combination of distinct lithological layers, a combination of portions of distinct lithological layers, or a portion of a single distinct lithological layer. The metalayer abstraction includes a collection of information, including that information contained within the lithological model for that layer, as described above, as well as sensed or calculated measurements made during drilling into that layer at the very location of rig W or at the locations of nearby rigs W that have previously drilled through that layer. As discussed above, this information includes the depths of the top and bottom of this layer at the location of drilling rig W, physical properties of the layer (e.g., compressive strength, etc.), and expected drilling parameters as the metalayer is encountered during drilling (e.g., minimum and maximum expected WOB, etc.). In addition, also according to this embodiment of the invention, it is contemplated that each metalayer includes information regarding how to drill through the physical layer, including limits on various drilling parameters that are defined for optimum drilling performance. This "how-to" information is contemplated to be generated by way of formulator ADA_F, according to this embodiment of the invention. It is contemplated that each of the metalayers will be referred to by way of a "layer name" or other indicator (layer number, offsets, etc.), so as to be correlatable with the drilling measurements acquired by other rigs W within the same or nearby production fields. This abstraction of information into metalayers enable this correlation of information among drilling rigs—by referring to a given metalayer by name or some other "tag" or link, specific parameters of the metalayer can be adjusted to be rig-specific, such as the depth at its top and bottom at the specific location of a given drilling rig W.

It is contemplated that these tools 14 and servers 16 implemented at information integration environment IIE allow the overall system to operate according to an observe-orient-decide-act ("OODA") sequence or loop. As known in the knowledge engineering art, the OODA loop is based on the concept of situational awareness, operable at the three hierarchic levels of perception (awareness of various situational elements and their current states), comprehension (recognition of patterns in system behavior, and interpretation and evaluation of those patterns), and projection (anticipation of future behavior in situations not previously encountered). The OODA loop operates by considering the awareness of a particular situation (at one or more of the three hierarchical levels), making a decision of an action to take based on that awareness, and then evaluating the result or performance of that action to improve the awareness capability. The specific actions performed in an OODA representation of this intelligent system control includes acquiring observations about the current environment, orienting those observations to the system being controlled based on previously gained knowledge, deciding on a course of action, and then acting on the decision, followed by repetition of the observation loop to evaluate the effect of the action taken. Information integration environment IIE according to this embodiment of the invention is intended to carry out these OODA steps for the task of drilling a well, with the higher-level comprehension and projection based on formulations created by formulator ADA_F, the construction and operation of which will now be described.

From a hardware standpoint, formulator ADA_F may be constructed as multiple computers or servers operating cooperatively, or alternatively as cloud, utility, or autonomic computing. It is contemplated that formulator ADA_F will include substantial memory resources, for example extremely large disk drive systems, for storing large quantities of data over time. As shown in FIG. 4, it is contemplated that one such memory source 20 (whether realized by a single dedicated disk drive, or as distributed among multiple disk drives) will store database DB, or another readily-accessible memory arrangement, for receiving and storing data sensed at the drilling rigs W currently in operation, and also data as sensed previously in other drilling rigs. Database DB in memory source 20 also stores rig identification information (hardware type information), lithology models, and the like to which well properties WP2 stored at rig clients T link, as discussed above relative to FIG. 3. Database DB also stores measurement data, calculations, and calibrations from rig clients T or calculated values otherwise derived, and the like. Memory resource 22, again implemented as a dedicated disk drive or distributed among multiple disk drive or other memory resources, stores knowledge base KB in which heuristics derived by other functions in formulator ADA_F, specifically by the computational (i.e., hardware and software) resource of inference engine 24 within formulator ADA_F. Knowledge base KB may be arranged and operate in the form of a neural net, from the standpoint of its development (i.e., "training") and operation. Also as shown in FIG. 4, formulator ADA_F includes WITSML application programming interface (API) 25, by way of which measurement data and the line are received from sensors S via information integration environment IIE. As evident in FIG. 4, various "engines" are realized as part of formulator ADA_F. The term "engine" in this embodiment of the invention refers to hardware and software computational resources that execute particular functions useful in connection with the drilling of oil and gas wells. Certain of those functions will be described in detail below, in connection with the description of the operation of this embodiment of the invention. It is contemplated that these hardware and software computational resources involved in a particular engine will typically be implemented as one or more software applications or objects, executed by digital logic processing circuitry within the computer system or systems in which formulator ADA_F is realized. The particular hardware arrangement of formulator ADA_F can vary widely, as discussed above. As such, the specific hardware used to implement these functions can also vary widely. In some architectures, the same general purpose central processing unit may be used to execute software applications or objects corresponding to each of these functions. In other architectures, dedicated processing circuitry may be provided for these functions. Still further in the alternative, in a distributed architecture, one or more specific computers may be used to realize a particular engine. In addition, some of the functions performed by these engines may be executed by application-specific digital logic circuitry (i.e., custom, semi-custom, or programmable special purpose logic such as digital signal processors). It is contemplated that those skilled in the art having reference to this specification will be readily able to realize these engines in various architectures, without undue experimentation.

As mentioned above, inference engine 24 is a computational resource, for example a software component executed by programmable processing circuitry within formulator ADA_F, that defines and updates various formulations (rules, heuristics, and calibrations) from information stored in knowledge base KB, as may be applied to measurements and conditions stored in data base DB, and stores those formulations in an accessible form, in knowledge base KB. Rules engine 26 is a computational resource, again a software component executed by programmable processing circuitry within formulator ADA_F, that selects those formulations that are appropriate for a certain situation, and forwards those rules to information integration environment IIE for configuration into software agents that apply those rules at rig clients T. As known in the art, rules engine 26 has the capability of inferring logical consequences from a set of "asserted" facts or axioms, which of course correspond to the measurements and conditions stored in database DB. Examples of algorithms useful in connection with rules engine 26 include a Rete-based algorithm, and a forward chaining rule engine, as commercially available. New or modified rule sets created by inference engine 24 and accessible to rules engine 26 are available for review and verification by a human expert driller, via one of remote administrators RA.

According to this embodiment of the invention, formulator ADA_F also includes trendologist function 28, which applies specific rules according to which data from sensors S are to be processed, combined, and displayed. In this embodiment of the invention, inference engine 24 generates rules, heuristics, and calibrations that are useful to trendologist function 28, which receives data from sensors S, processes those data for coherence and usefulness, and based on applicable rules for the current drilling situation, arranges data for display at the corresponding rig clients T in a meaningful fashion.

Other "engines" are also included within formulator ADA_F according to this embodiment of the invention. Agent engine 30 is a computational resource within formulator ADA_F that adds, modifies, deletes, and monitors all software agents that are created within the system. Based upon the results obtained by inference engine 24 as may be verified by a human expert via remote administrators RA, if a new software agent ought to be created, or an existing software agent ought to be modified to be more effective, agent engine 30 is the computing resource that performs that function. Drilling state engine 32 is a computational resource within formulator ADA_F in the form of a generic state machine, configurable based on various rules and heuristics as appropriate, to monitor events and to determine drilling "states" (e.g., drilling, sliding, circulating, etc.) for a given drilling rig W, based on the sensed data and knowledge stored in knowledge base KB, according to developed rules and heuristics.

As in the case of information integration environment IIE and as discussed above, formulator ADA_F can be implemented by a single installation of hardware, for example deployed at a data center or some other location remote from the drilling sites. Alternatively, formulator ADA_F can be deployed in a distributed manner, indeed in a manner that is distributed over the same hardware resources as information integration environment IIE if desired. Indeed, it is contemplated that the distribution of the hardware in the architecture may itself be situationally-aware, with various hardware entities used depending on the sensed and anticipated conditions for the well. However it may be implemented, it is preferred that formulator ADA_F operate as a unitary whole, so that each instance of the information integration environment IIE and of rig clients T can benefit from the knowledge gained from all other instances currently operating, and operated in the past.

Figure 5:
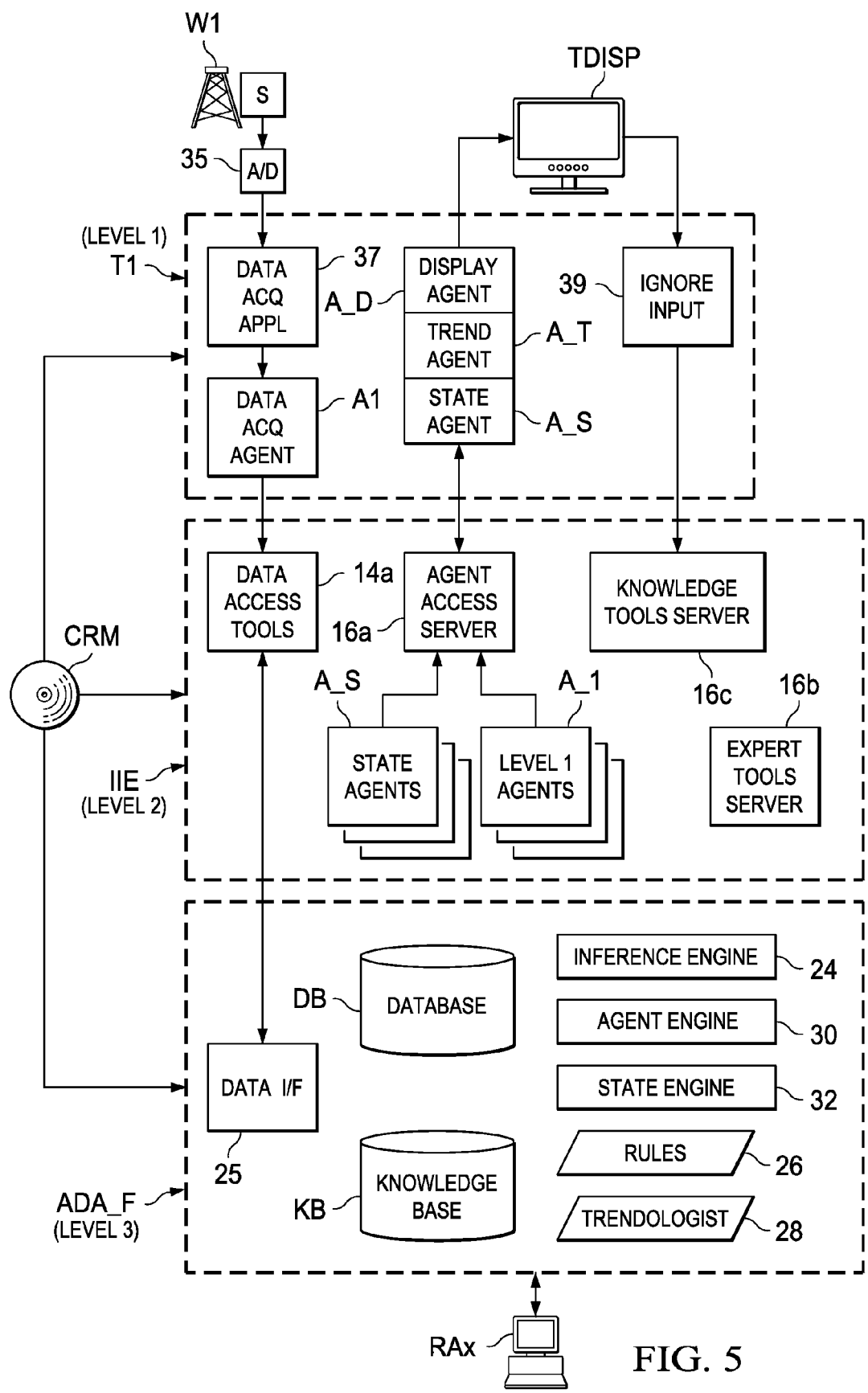
FIG. 5 is a schematic diagram illustrating the arrangement and operation of software components in the system constructed according to embodiments of the invention.

It is contemplated that this invention may be realized in the form of a software application on a computer readable medium, for example a magnetic disk drive, an optical disk, or the like, either directly physically readable by one of the computers (i.e., one or more of the server or main-frame computers realizing information integration environment IIE or formulator ADA_F. and also including rig clients T), or stored on such a medium in a location from which one of those computers may download the software application, or download an installer of such a software application which, when executes, downloads and installs the software application, in either case being communicated to one of those computers by way of encoded information on an electromagnetic carrier signal via the appropriate interface or input/output device. Further in the alternative, the software application may be in the form of a web-based application, in which case the application can reside and be executed remotely. FIG. 5 represents such a computer readable medium, directly readable or downloadable as the case may be, by way of computer readable medium CRM. It is contemplated that those skilled in the art will be readily able to realize the appropriate computer readable medium and the contents of such a medium by way of which the necessary software application can be installed and implemented on a particular system, based on this description and according to this invention.

Operation of the Preferred Embodiment of the Invention

The operation of the system according to the preferred embodiments of this invention will now be described in connection with several examples. It is contemplated that those skilled in the art having reference to this specification will be readily able to comprehend the operation of this system from those examples, and to comprehend the operation of this system in connection with other similar and analogous tasks and functions beyond those described by example in this specification. FIG. 5, in combination with the other Figures, provides an overview of the operation of this system.

According to this embodiment of the invention, prior to the initiation of a drilling operation at drilling rig W1 at production field F1, for example, formulator ADA_F will have previously acquired drilling data, including measurements and calculations made by one or more rig clients T at various drilling rigs W in various production fields F. These data will be stored within database DB. As will become evident from this description, it is not essential that formulator ADA_F have data from the very production field F1 at which drilling is to begin, or from the very equipment of drilling rig W1 itself. Although such data, rules, heuristics, and calibrations will be more accurate if that rig-specific and field-specific information was previously available, drilling can commence at drilling rig W1 based on rules and heuristics that are deemed to be the best fit for that site, or generic drilling rules. Because formulator ADA_F is an adaptive system, the acquisition of new data during the operation of drilling rig W1 in combination with inputs from the driller at rig client T1 and also from human experts at remote administrators RA will result in the development of formulations that will better apply to the current equipment and environment of drilling rig W1.

By way of a general operational description, during the drilling operation, rig client T1 executes one or more software agents instantiated, configured and forwarded to it by information integration environment IIE to assist the driller with control and management of the drilling operation. According to an embodiment of the invention, the combination of rig clients T with information integration environment IIE and with formulator ADA_F implements a three-level "situational awareness" intelligent drilling advisor system, so that attributes of the drilling operation are perceived (i.e., measured and current parameter values evaluated), comprehended (e.g., by determining current "states" of the drilling operation, of the drilling equipment involved, and the subsurface lithology into which the wellbore is being drilled), and projected (e.g., by making and presenting recommendations for action to the driller). This situational awareness is implemented in the rules, heuristics, and calibrations formulated by formulator ADA_F, which are configured as tools by information integration environment IIE into software agents selected for particular drilling rigs and clients, and then sent to those rig clients T for execution at the drilling site.

Figure 13:
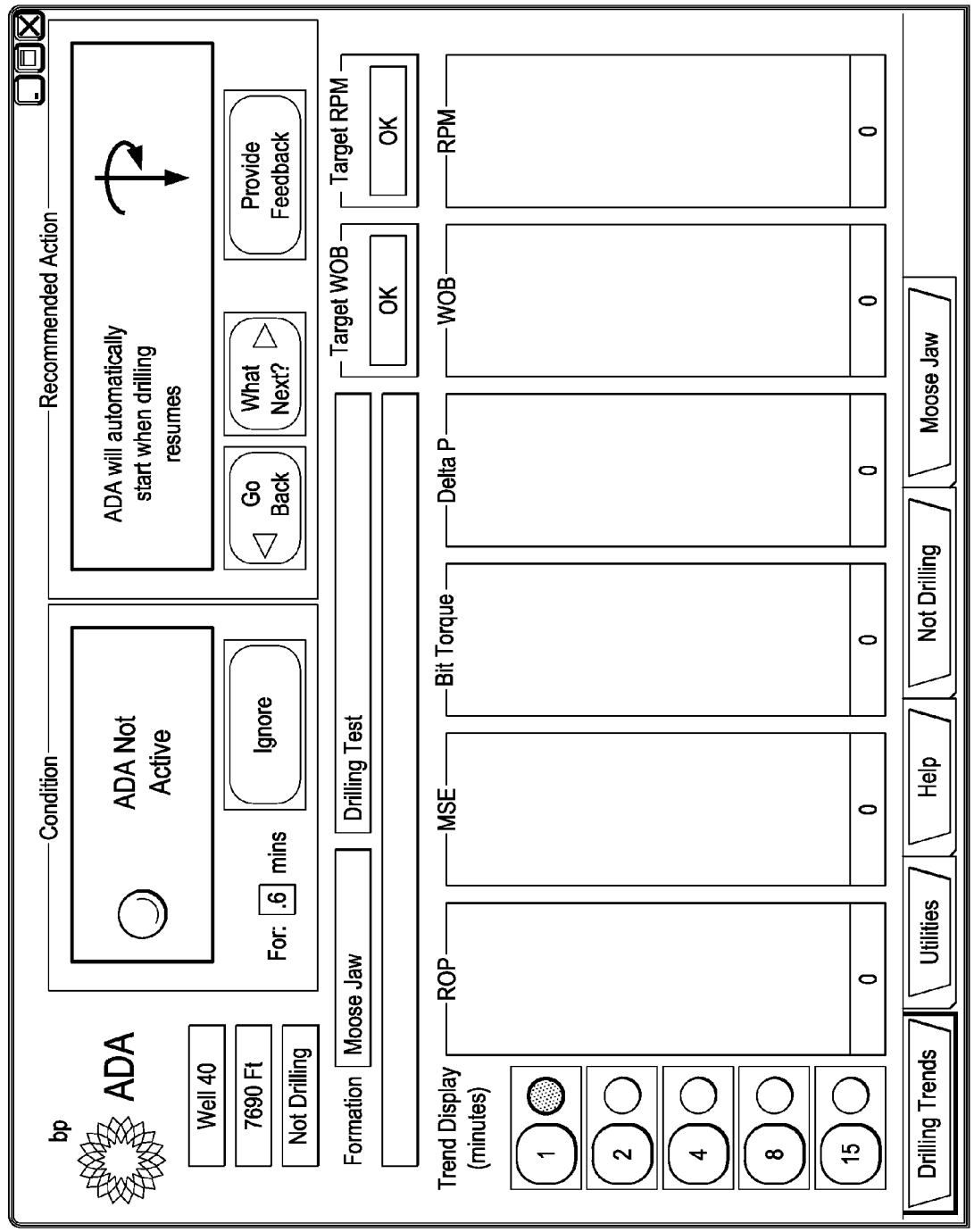
FIGS. 13 through 15 are screen shots illustrating examples of the visual output at the drilling rig according to an example of the operation of an embodiment of this invention.
Figure 14:
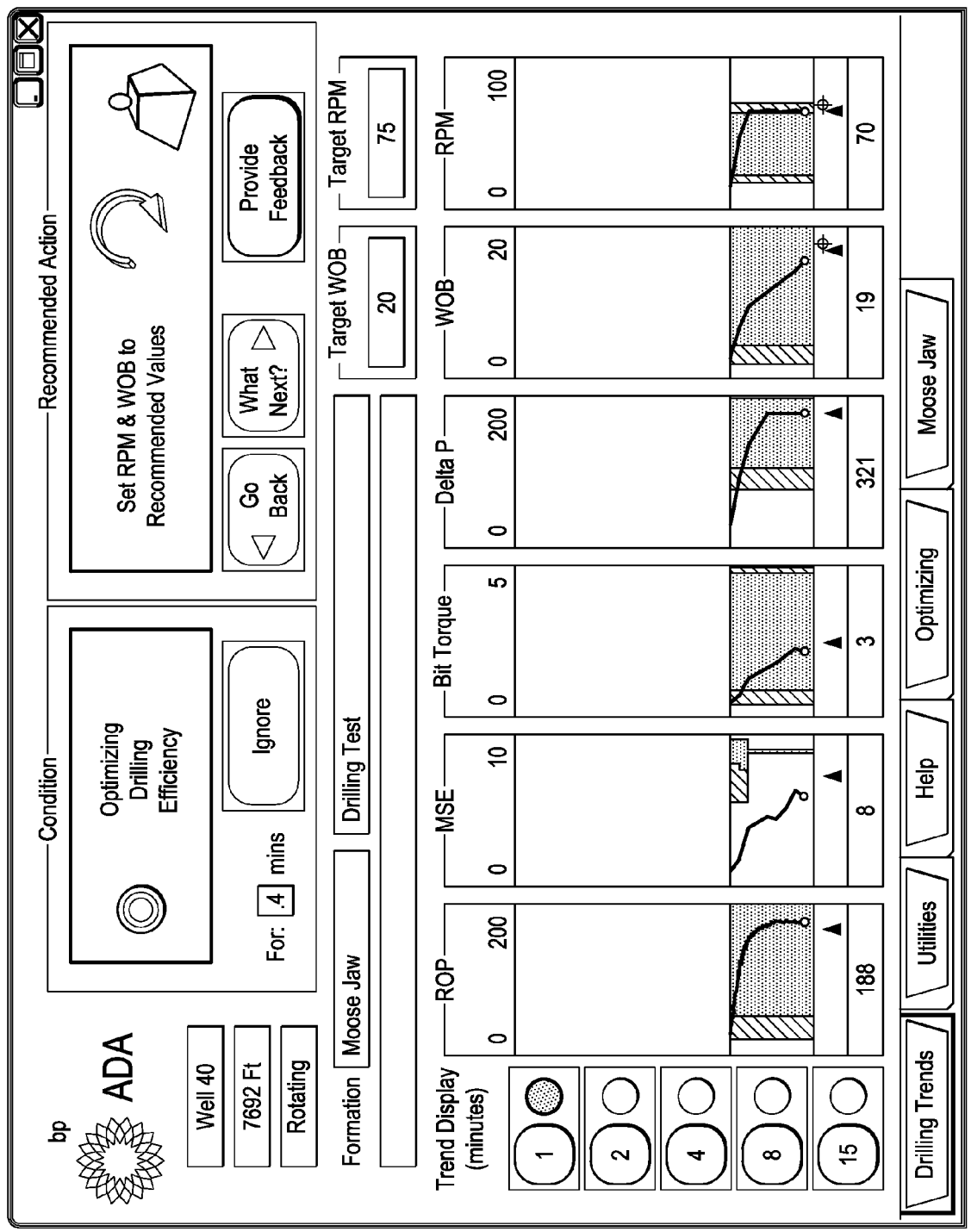
Figure 15:
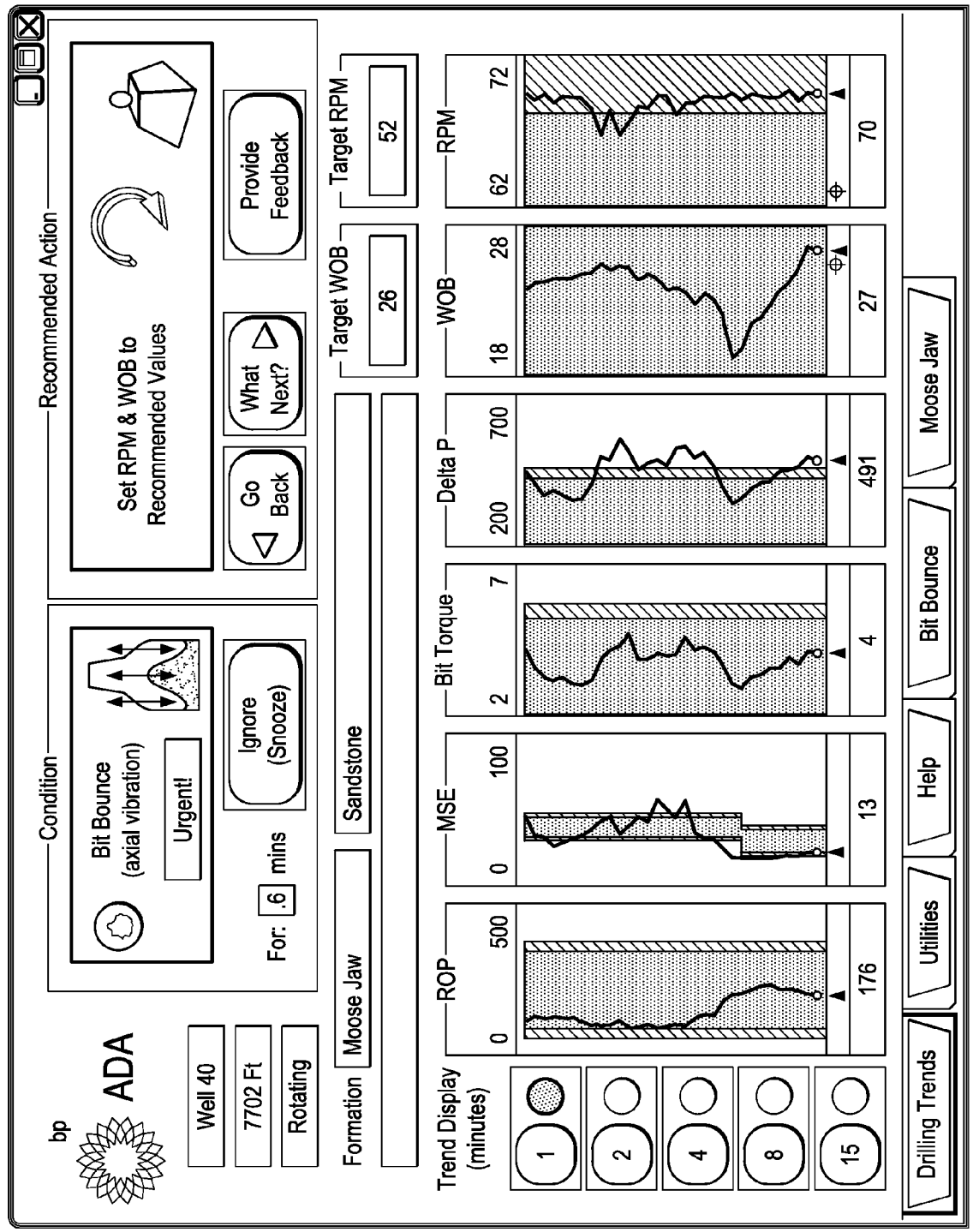

According to an embodiment of the invention, rig clients T present current measurements, trends and acceptable ranges of those measurements, indications of the current state of the drilling operation, and recommendations for future action, by way of a human machine interface ("HMI") on a visual display, preferably a touchscreen so that the driller's inputs are received by way of the same graphical user interface (GUI). FIG. 13 illustrates an example of the display from this human machine interface at rig client T1, at a point in time at which drilling rig W1 is idle, having drilled 7690 feet into the earth. The human machine interface indicates that the current drilling state is "Not Drilling". In FIGS. 13 through 15, "ADA" is a trademark of BP North America Inc., used in connection with its systems and software systems for assisting drilling.

Once drilling begins, measurement data from sensors S at drilling rig W1 are received at rig client T1. Software agents that have been previously forwarded by information integration environment IIE to rig client T1, or alternatively new agents that are identified, configured, and sent by information integration environment IIE in response to measurements from drilling activity, begin executing. As shown via the HMI as illustrated in FIG. 5, one of these software agents (state agent A_S shown in FIG. 5) determines that the current state of the drilling operation is "rotating". Another software agent or agents (e.g., trend agent A_T and display agent A_D of FIG. 5) display the current values of measurements and calculated parameters over time, along with recommended values and a recommended range (shown as the shaded portion within each trend display of FIGS. 14 and 15). As previously described, trend agent A_T includes various rules, heuristics, and calibrations developed by formulator ADA_F, specifically using its "trendologist" function, to determine a preferred frequency with which the measurements or calculations are derived and displayed, based on the quality of the measurements and other variables; a measure of the reliability of each of these measurements and calculations is also preferably determined. FIG. 14 illustrates these measurements and calculations as the rate of penetration (ROP), the mechanical specific energy (MSE) corresponding to the energy expended for a given volume of earth removed, bit torque, the weight on bit (WOB), the RPM of the drill string at the rotary table of drilling rig W1, and the pressure differential (Delta P) between the standpipe pressure and a base setting. The base setting of the pressure differential, in this embodiment of the invention, is derived by the trendologist function 28 of formulator ADA_F at various times and states in the drilling operation, based on sensed measurements such as strokes per minute of the mud pumps, and known mud equipment parameters such as piston diameter, pipe diameter, etc. will affect this base setting. The HMI at rig client T1 also indicates recommended actions to be taken ("Set RPM and WOB to Recommended Values" in the example of FIG. 14) to optimize the drilling operation, and provides a way for the human driller to enter feedback.

One or more drilling state agents A_S instantiated and forwarded by information integration environment IIE to rig client T1 preferably operates, again according to rules, heuristics, and calibrations derived by formulator ADA_F for the particular drilling rig W1 based on its equipment, and the lithology and location of the site of that drilling rig W1, to determine whether a drilling dysfunction is occurring based on current and trended measurements and calculations, and if so, what the dysfunction is. FIG. 15 illustrates such a situation, in which the HMI indicates that a "bit bounce" dysfunction is present; some of the measurements (MSE, Delta P, RPM) are outside of their recommended ranges at this point, and most likely (depending on the rules) were at least partially the basis of the identified dysfunction. A recommendation is also provided to the driller, as before.

An input mechanism is provided at touchscreen display TDISP, as shown in FIGS. 13 through 15, by way of which the driller or drilling engineer can choose to "ignore" the displayed recommendation. If this occurs, that "ignore" input will be communicated back to information integration environment IIE and formulator ADA_F, along with measurement data and other information regarding drilling rig W, for incorporation into new and updated rules, heuristics, or calibrations as appropriate. In any event, whatever the action taken by the driller or drilling engineer in response to the recommendation, the system will continue to monitor, communicate, display, and provide recommendations during the drilling operation.

Given this generalized description of the operation of the system, various features, aspects, and components of such a system according to an embodiment of the invention will now be provided in further detail.

Agent-Based Drilling

As mentioned above, servers in information integration environment IIE operate to instantiate, configure, and send software agents to rig clients T, such software agents being selected and arranged according to various attributes of drilling rig W associated with each such rig client T. In this regard, integration environment IIE and its drilling applications stack operate to select, instantiate, configure, and manage these software agents.

FIG. 5 illustrates the overall arrangement of software agents and resources associated with those agents, within an example of a system according to this embodiment of the invention. Rig client T1, associated with drilling rig W1 in this example, receives signals from sensor S via analog/digital converter 35 and other functions within a data acquisition system (not shown). Rig client T1 receives the digital measurement data corresponding to sensor S output via data acquisition application 37 executed at rig client T1. Data acquisition agent A1, configured and instantiated by agent access server 16a at information integration environment IIE, is executing on rig client T1, and is forwarding measurement data according to that configuration to information integration environment IIE, via agent access server 16a. Other software agents are also being executed at rig client T1, including trend agent A_T for deriving trends of measured data. State agent A_S is also executing at rig client T1, for determining the current drilling state of drilling rig W1, based on the measurement data and on formulations for determining drilling states. Display agent A_D operates to display measurement data, trends of that data, drilling recommendations, current and upcoming drilling state indications, and other information at touchscreen display TDISP of rig client T1. Inputs from the driller (terrestrial drilling) or drilling engineer (offshore drilling) are received by touchscreen display TDISP, and in the case of at least "ignore" inputs responsive to displayed recommendations, are forwarded via function 39 to information integration environment IIE, specifically via knowledge tools server 16c therein.

As shown in FIG. 5, information integration environment IIE includes agent access server 16a. Agent access server 16a has access to a collection of "level 1" agents A_1, which include data acquisition agents, trend agents, display agents, and the like that are executable at rig client T1. According to this embodiment of the invention, agent access server 16a can select from among these agents A_1, and also from among state agents A_S, depending on the current drilling state and other conditions at drilling rig W1. This selection, configuring, and instantiation of agents A_1, A_S by agent access server 16a in this situationally aware manner will be described in further detail below relative to FIG. 6. Referring still to FIG. 5, however, information integration environment IIE also includes expert tools server 16b, described above and which will be further described below. Information integration environment IIE processes measurement data received from agent A1 at rig client T1, using data access tools 14a, and forwards these processed data to formulator ADA_F, via data interface 25 (e.g., WITSML API 25, shown in FIG. 4).

Figure 6:
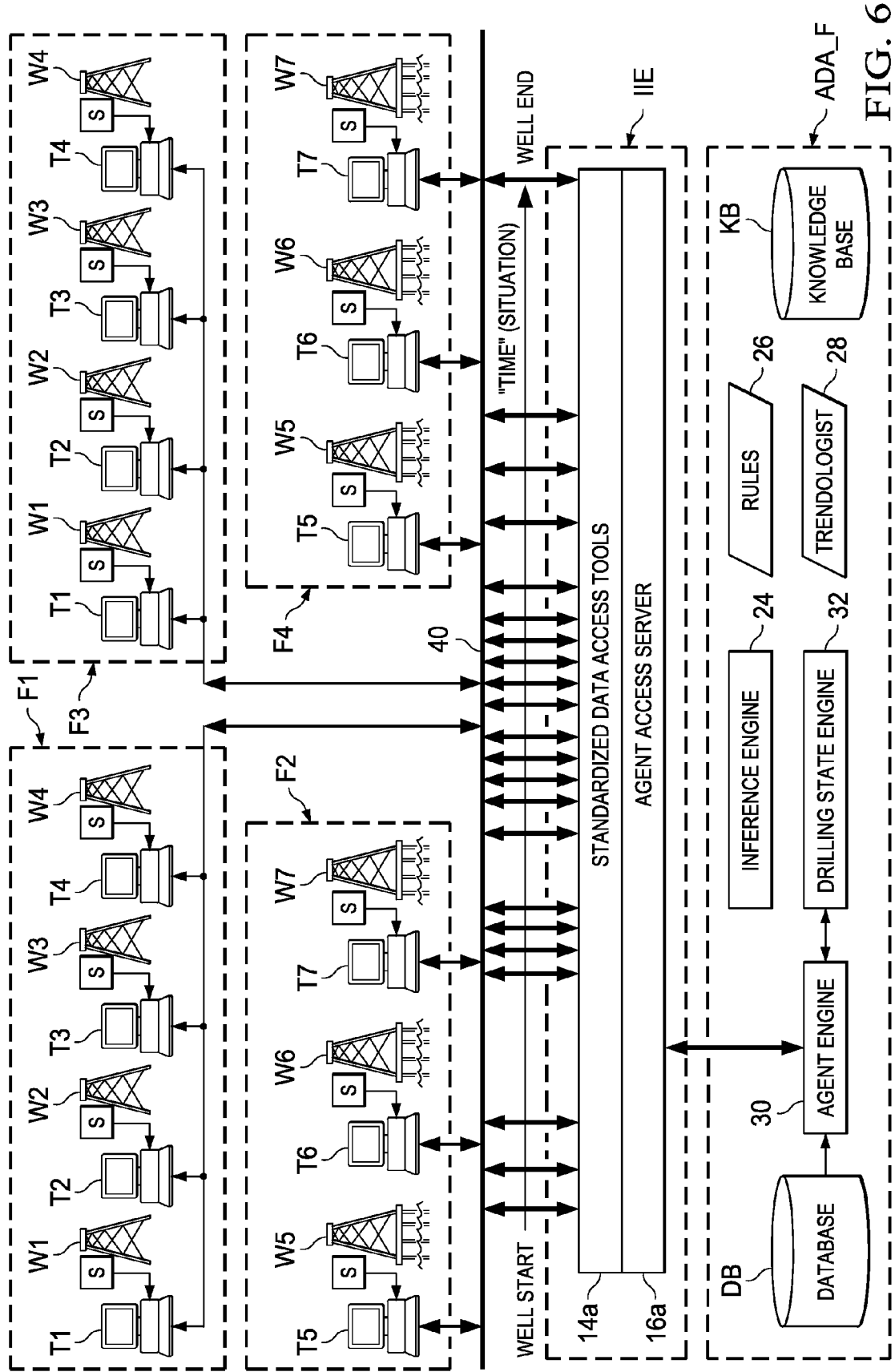
FIG. 6 is a schematic diagram illustrating the operation of software agents in assisting the drilling of a well according to an embodiment of the invention.

FIG. 6 illustrates the overall operation of agent-based drilling according to an embodiment of this invention, in connection with multiple drilling rigs W deployed in multiple fields F1 through F4. Agent engine 30 identifies software agents that may be useful in connection with the drilling of drilling rigs W in production fields F1 through F4, modifies those agents based on recent updates to formulations (rules, heuristics, and calibrations) by inference engine 24, and monitors those software agents that are in use or become in use within the system. This identification of software agents that may be useful in a particular drilling state is made by agent engine 30, in response to drilling state determinations made by drilling state engine 32.

For purposes of agent-based drilling, according to this embodiment of the invention, agent access server 16a within information integration environment IIE selects, configures, and instantiates software agents in a situationally aware manner, for each of the wells W of interest in the multiple production fields F1 through F4. As evident from FIG. 6, the software agents instantiated at rig clients T occur at varying points in time, rather than on a periodic basis; this non-uniform instantiation (and termination) of software agents by agent access server 16a reflects the situational awareness involved in this overall process. In a general sense, drilling state engine 32 determines a drilling "state" of each specific drilling rig W, based on measurement data acquired and forwarded to formulator ADA_F from sensors S at that drilling rig W, and based on various formulations, and communicates the deduced drilling state to agent engine 30. Agent engine 30 in turn forwards software agents appropriate for that drilling state for that particular drilling rig W to agent access server 16a, if not already at and configured within information integration environment IIE. In turn, agent access server 16a instantiates the indicated software agents at rig client T associated with the drilling rig W of interest.

Figure 7:
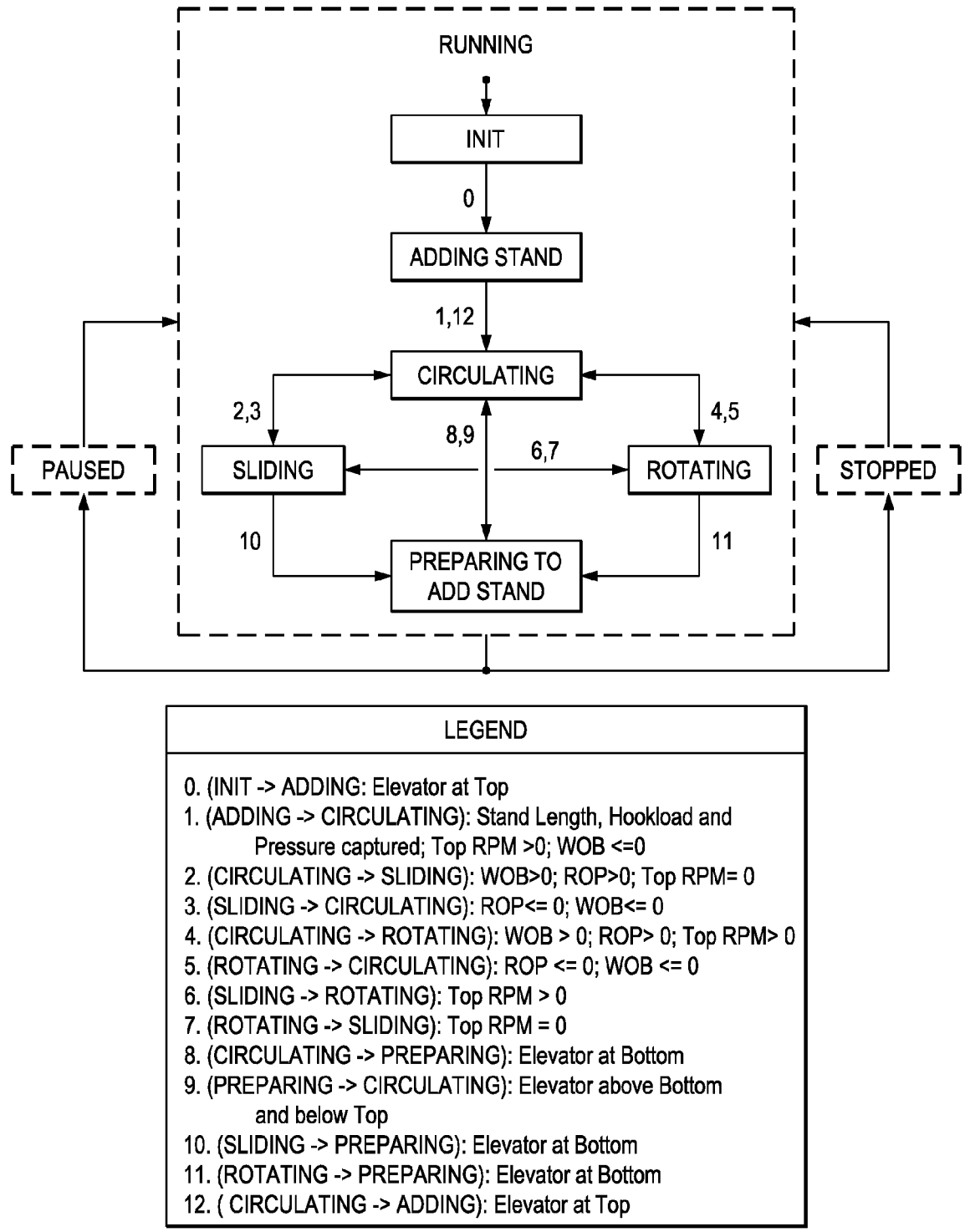
FIG. 7 is a state diagram illustrating an example of the operation of a drilling state engine according to an embodiment of the invention.

For purposes of instantiating and operating software agents such as data acquisition agents A, display agents A_D, trend agents A_T, state agents A_S, and the like, drilling rig W can be considered to pass through a variety of drilling states. FIG. 7 illustrates a state diagram according to which drilling state engine 32 (FIG. 6) can determine the drilling state of drilling rig W. As shown in FIG. 7, the available states are initialization (INIT), adding stand (ADDING), circulating drilling mud (CIRCULATING), rotating the drill string (ROTATING), preparing to add another stand of drill pipe (PREPARING), sliding of the drill string (SLIDING), as well as stopped and paused states. The state diagram of FIG. 7 illustrates the various transitions that are permissible in this example of the determinations made by drilling state engine 32. For example, a transition from state INIT to state ADDING is detected by drilling state engine 32 upon receiving data (e.g., alarms and events from state agents A_D executing at rig client T1) indicating that the elevator of drilling rig W is at the top. Transition from state ADDING to state CIRCULATING is deduced upon the detection of stand length, hookload, and pressure measurements being captured, in combination with data indicating that drill string RPM at the top of the drill string is greater than zero, in combination with zero (or negative) weight-on-bit WOB. Transition to state SLIDING from CIRCULATING is deduced from positive values of WOB and rate-of-penetration (ROP), in combination with zero drill string RPM. The other transitions within the state diagram of FIG. 7 in this example are evident from the "Legend" of that Figure, and correspond to knowledge of the behavior of drilling rigs based on various measurements.

It is contemplated that multiple state transition rule sets may be implemented at drilling state engine 32. For example, the state transition diagram illustrated in FIG. 7 corresponds to the available states for a "running" condition of drilling rig W. On the other hand, different state transition rule sets may apply in difference circumstances, for example if the drilling rig is currently being "tripped", or if a "casing" operation is being performed at the drilling rig, or during particular test sequences such as a blow-out prevention equipment (BOPE) test.

As noted above, referring back to FIG. 6, drilling state engine 32 deduces a transition to a particular drilling state for each drilling rig W of interest, indicating the same to agent engine 30, which in turn controls agent access server 16a to instantiate or terminate various software agents at the corresponding rig client T for that drilling rig W. Agent access server 16a then forwards the appropriate software agents to rig client T over the appropriate physical communications facility (shown as well communication bus 40 in FIG. 6), configured as appropriate for the newly-detected state at the corresponding drilling rig W.

For example, one of the software agents that may be configured, instantiated, and sent to a given rig client T1 for its drilling rig W1 may include data acquisition software agent A1 (FIG. 3), by way of which information is acquired from its sensors S. Data acquisition software agent A1 will be configured for rig client T1 to include those resources applicable to the sensors S that are installed and operational at drilling rig W1, such configuration being provided by information integration environment IIE. Agent access server 16*a* will then send the outfitted software agent to rig client T1, via well communication bus 40. In this example, various detailed preconditions are to be satisfied before this agent A1 begins its operation at rig client T1:

rig client T1 is operating, and is receiving data from sensors S;

agent access server 16*a* has forwarded agent A1 to rig client T1;

agent A1 is operating and functioning properly (no execution errors);

agent A1 has obtained the proper security authority, within rig client T1, to forward data to agent access server 16*a*.

Upon these preconditions being satisfied, software agent A1 begins carrying out its assigned task, which in this case is the acquisition of measurement data from sensor S. In operation, rig client T1 generally executes a resident application to receive data from the data acquisition system, and as determined by that application, writes blocks of data to a file in a memory resource such as a disk drive or flash memory within T1. These data are then available to data acquisition software agent A1. For example, a sequence of operations by agent A1 in acquiring such measurement data may include:

agent A1 detects an "end of file write" to a data file at rig client T1;

agent A1 "packages" data in the written data file for transmission. e.g., by converting the data to a WITSML format in preparing for transmission of the data to information integration environment IIE;

agent A1 sends the packaged data file to agent access server 16*a* via well communication bus 40;

agent A1 receives acknowledgement of valid file receipt from agent access server 16*a*;

agent A1 prepares for a next file, and waits for an "end of file write".

Data acquisition software agent A1 can remain instantiated at rig client T1 until such time as it is terminated by agent access server 16*a* in response to a change of state or some other indication from agent engine 30, or upon agent A1 terminating itself upon reaching some post-condition event or state.

Of course, more than one data acquisition software agent will typically be active and operating at many rig clients T at any given time, considering that multiple data sources (e.g., sensors S, well parameters WP1 and well properties WP2 stored at rig client) will be receiving and providing measurement and other data during drilling operations. Such operation is described above in connection with FIG. 3. These multiple data acquisition software agents can operate in a coordinated fashion with one another, and with other software agents carrying out other functions, including the trend, display, and drilling state agents being executed at rig clients T, as well as in combination with agents being executed within information integration environment IIE and formulator ADA_F.

As will be described further below, these data acquisition software agents collect data and information that are used to derive formulations for creating a "best well" model specific to the drilling rig W, and for deducing dynamic transition triggers, based on that model and on the acquired measurement data and information, to provide recommendations to the driller or drilling engineer for achieving that optimum well. As such, in addition to the data acquisition software agents, other agents will be created, configured, and instantiated that perform those functions, examples of which are trend agent A_T, display agent A_D, and state agent A_S at rig client T1 (FIG. 5). These and other software agents operable within the system of this embodiment of the invention preferably have specific agent properties that assist this interoperation. As such, the software agents available and operable within this embodiment of the invention preferably constitute a network of persistent, autonomous, goal-directed, sociable, reactive, non-prescriptive, adaptive, heuristic, distributed, mobile, and self-organizing agents. These properties and attributes of software agents will be familiar to those skilled in the art having reference to this specification.

Adaptive Data Access Tools (Data Grinder and Trendologist)

As noted above, multiple data acquisition software agents A_1 will typically be operating simultaneously to acquire measurement data and other information (e.g., well parameters WP1, well properties WP2) regarding drilling rig W. The various measurement data provided via these multiple data acquisition software agents will necessarily be of varying time frequency, of varying "quality" (i.e., precision or variability), and will have other varying attributes. According to this embodiment of the invention, data access tools 14*a* within information integration environment IIE provide the capability of intelligently and adaptively acquiring these data of varying quality and nature from the various data sources and data acquisition agents. As will now be described in connection with FIG. 8, trendologist function 28 and data grinders $44_1$ through $44_n$ adaptively process the data acquired by standardized data access tools 14*a* (FIG. 4).

Figure 8:
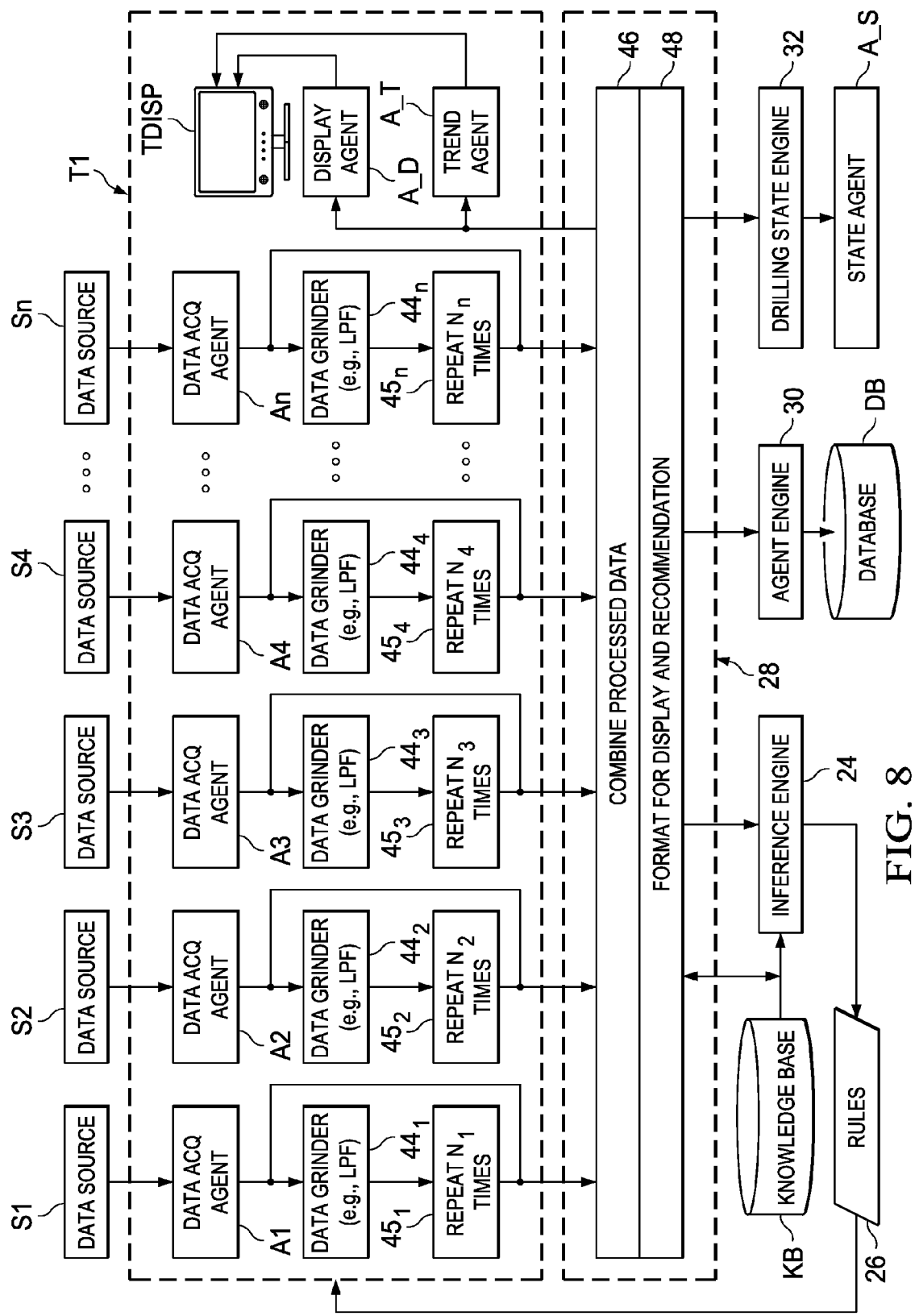
FIG. 8 is a data flow diagram illustrating an example of the operation of data access tools including trendologist and data grinder functions according to an embodiment of the invention.

FIG. 8 illustrates the flow of measurement data and other information within the system of this embodiment of the invention. Data sources S1 through Sn correspond to sensors S that provide measurement data to rig client T, or to data stored within rig client T itself (well parameters WP1, well properties WP2, etc.), or other information regarding drilling rig W. Data acquisition software agents A1 through An are each instantiated and associated with corresponding data sources S1 through Sn, and operate to acquire measurement data or other information from its corresponding data source S1 through Sn, as described above. According to this embodiment of the invention, each of data acquisition agents A1 through An forward the acquired data to a corresponding data grinder $44_1$ through $44_n$ as shown in FIG. 8. Data grinders 44 are computing resources located within rig client T, and trendologist is a computing resource located within formulator ADA_F (FIG. 4).

Data grinders $44_1$ through $44_n$ process the measurement data from corresponding data sources S1 through Sn via agents A1 through An. According to this embodiment of the invention, the processing applied by data grinders 44 is determined by previously-determined formulations (rules, heuristics, and calibrations) stored in knowledge base KB and accessed by rules engine 26, such formulations typically specific to the corresponding data source S, and in combination with other information regarding drilling rig W, including the current drilling state, past measurements, etc. An example of a process that is contemplated to be often applied by data grinders 44 is a low-pass filter, such that higher-frequency variations in the signals from data source S are smoothed over time.

According to this embodiment of the invention, this processing is performed from one to N times on each block or group of measurement data, as determined by repeat function 45. This number of repetitions applied by repeat function 45 will vary among the various data sources S, as indicated by the particular rules being enforced by trendologist 28 upon data grinders 44. It is contemplated that the rules applicable to data grinders 44 and repeat function 45 will consider the quality of the data (i.e., the extent of noise in the data, the variance of the data, the presence and frequency of outliers, and the like), the frequency of the data (i.e., the frequency over time at which measurements are obtained), and the like. As discussed above, "reliability" ratings may be computed or otherwise derived from the measurement data by software agents, and used to determine the extent of processing to be applied to the measurement data by data grinders 44, including the number of repetitions. For example, the rules may indicate that measurement data from downhole sensors S, which are inherently noisier or otherwise less reliable than sensors at the surface, may require additional filtering and thus a higher number of repetitions through data grinder 44, as compared with the data from the surface sensors. By way of another example, it is contemplated that some sensors S may provide measurement data at a much higher frequency than is relevant in the use of that data; additional repetitions of data grinder 44 may also be appropriate for those measurements. In addition, data grinders 44 for the various data sources may also apply some type of normalization or other processing so that the processed data from the various data sources S is consistently presented, in a recognizable form relative to the data from other data sources. It is contemplated that the data grinder rules formulated according to this embodiment of the invention will consider those and other factors in defining the data grinding sequence for each data source S.

Trendologist 28 also includes combining function 46 that combines the processed data from the multiple data sources, and formatting function 48 that formats the processed data, as combined, into a recognizable and processable format for various software agents. Combining function 46 refers to various rules, heuristics, and other previously determined formulations to select the various data streams that are to be combined for each of the various purposes and destinations, and optionally weighting the particular data sources in effecting such combination. Formatting function 48 arranges the result of the combined processed data into a form that can be immediately utilized by the various destinations, including not only a physical format for the processed and combined data, but also its granularity, smoothness, statistics derived from the various datasets, and the like. The selecting and weighting determined by combining function 46 within trendologist 28, and the formatting determined by formatting function 48 within trendologist 28, are applied to data grinders 44 and to other software agents at rig clients T, so that the desired combining and formatting is accomplished.

As such, according to this embodiment of the invention, trendologist 28, working in concert with and through data grinders 44, effectively converts the raw input perceived by sensors S into data and information that can be immediately utilized and comprehended by software agents and formulator ADA_F. Trendologist 28 is automatically and manually scalable, for example by application of rules selected by rules engine 26 for the current situation, to provide the granularity of information needed to provide recommendations to the driller at drilling rig W for adjusting the drilling process. As such, the combination of trendologist 28 and data grinders 44 extend the simplistic concepts of WITSML into the creation of a situationally-aware set of data access tools 14a (FIG. 6), accepting any number and manner of drilling perception entities and delivering multiple sets of industry standard, common tool readable, datasets for use within or outside of formulator ADA_F. The resulting processed and combined data can be rendered complete, compensating for missing data types and incorrect or outlier data, for example for those data outside of previously "agreed" bounds of the downstream agents and formulator processes.

Some of these downstream destinations of data processed, combined, and formatted, according to the formulations applied by trendologist 28, are illustrated in FIG. 8. Inference engine 24 is one destination of these data. In response to the newly-acquired data from trendologist 28, inference engine 24 is capable of modifying existing formulations, or of creating new formulations and rule sets, including new rule sets that control trendologist 28 itself. The new or updated rules are stored in knowledge base KB, and accessible to rules engine 26 for selection according to the current drilling situation. Inference engine 24 can also apply new inferences intelligently derived from the newly-received data into knowledge base KB. Agent engine 30 can also receive some or all of the processed combined newly-received data from trendologist 28, and can update or configure existing or new software agents accordingly; an agent instantiated by agent engine 30 at formulator ADA_F can also manage the storage of the newly-received data into database DB. Drilling state engine 32 can also receive the newly processed measurement data and other information, can identify a current or upcoming drilling state (FIG. 7), and can configure or update state agents A_S accordingly.

The processed data will also typically be forwarded to other software agents, including agents that are being executed at rig client T for the corresponding drilling rig W (or, in some cases and depending on the rules, at rig clients T associated with other drilling rigs W beyond the source of the new data). Display agent A_D can receive the processed data from trendologist 28, formatted according to previously formulated rules for displaying useful information to a human driller via display TDISP, and consistent with the current drilling state and conditions at drilling rig W. In addition, according to this embodiment of the invention, display agent A_D produces one or more recommendations regarding changes or adjustments to make in the drilling process, according to rules, heuristics, and calibrations previously formulated by formulator ADA_F that are configured within display agent A_D; the resulting recommendation, if any, is displayed on touchscreen display TDISP, as described above, the driller or drilling engineer can provide an input ("ignore" or "accept") via touchscreen display TDISP. Trend agent A_T also can receive the processed data from trendologist 28, and derive various trends in the measurements, again according to rules by which trend agent A_T was configured by information integration environment IIE.

In this manner, trendologist 28, working in concert with data grinders 44, process, filter, format, and otherwise condition the measurement data and other information, on a situationally aware basis, and present those processed data to the various destinations. According to this embodiment of the invention, estimates of measurement data are created, using certain data analyzer parameters selected to create those estimates, for example based upon the quality (e.g., noise energy) of the sensed data, knowledge regarding the model and manufacturer of the sensors (and past history of the quality of such data), other measurements concurrent with the sensed data, the current lithology into which the drilling is taking place at the time of the sensed measurements, and the like. Based on these estimates, such parameters as the current depth, and various current and cumulative parameter values, can be iteratively derived, and used to determine the manner in which the measurements are displayed at the affected rig client T. For example, poor quality data from sensors S known to be noisy may be displayed over relatively long intervals, and heavily filtered and processed, while "cleaner" data may be displayed closer to real-time. Furthermore, trendologist 28 may calculate data "reliability" values for each measurement, in this manner, and use those reliability measurements in the display of data at rig client T, as well as in decisions and recommendations to be made according to the corresponding formulations.

Figure 9:
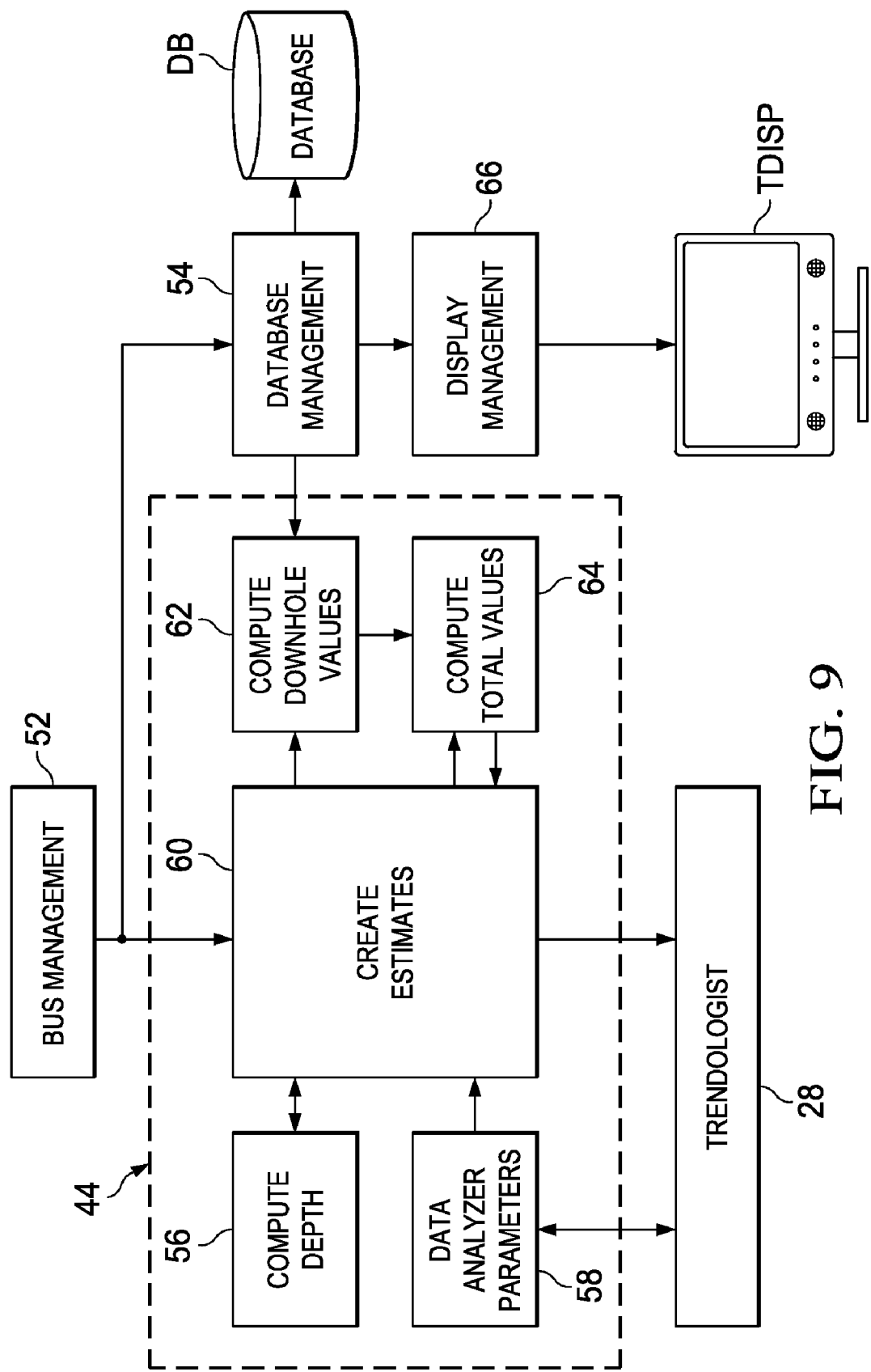
FIG. 9 is a process flow diagram illustrating an example of the operation of the trendologist and data grinder functions of an embodiment of the invention.

FIG. 9 illustrates an example of this operation of trendologist 28 and the various software agents and functions within information integration environment IIE, in the form of a process flow diagram that creates estimates from various measured parameters, for example the computation of estimates of a parameter along the length of the wellbore, from measurements taken at the surface. As described above, this operation is being carried out by the network of software agents, as instantiated by agent access server 16a (FIG. 6), and operating in combination with tools 14 (FIG. 4) of information integration environment IIE. In this example, bus management process 52 receives the data from the various sensors S and data acquisition software agents concerned with drilling rig W, to provide measurement data and other information to the overall process. These data and information are applied to estimate creation process 60 within data grinder 44, which generates the estimates that are desired to be created from these data and information, as indicated by trendologist 28 by way of data analyzer parameters 58 forwarded from trendologist 28 to data grinders 44, incorporating the various rules and parameters for processing the received data and information, and for combining that processed data into the desired estimates. For example, in the process flow illustrated in FIG. 9, depth computation process 56 computes the depth of the wellbore from the various data and information as processed by estimation process 60, and process 62 computes downhole values from received data and information. Based on historical data stored in database DB and accessed by database management process 54, process 64 computes total values for the parameter based on the downhole values from process 62, and from other processing of the data and information by process 60. Process 60 then forwards the results to database management process 54 for storage in database DB, and for display at display TDISP of rig client T via display management process 66. As part of process 60, trendologist 28 also determines a useful scale and granularity for displaying the processed measurement data at touchscreen display TDISP of rig clients T; for example, measurement data that are changing slowly but for which precision is important may be displayed at a magnified scale so that small yet important shifts in the data are visible, while noisy or imprecise measurement data can be shown at a less-magnified scale, or over an expanded time scale. Trendologist 28 also receives at least some of the results of the estimates from process 60 as feedback for the data analyzer parameters 58 that it forwards to estimation process 60. Accordingly, the operation of data grinders 44 and trendologist 28 serves to efficiently and intelligently create estimates of various drilling parameters, conditions, and estimated values.

Expert-Based Drilling

According to another aspect of this invention, expert-based drilling is implemented by way of formulator ADA_F operating thorough software agents instantiated by information integration environment IIE and executing at rig clients T. According to this aspect of the invention, this expert-based operation of the system of this embodiment of the invention effectively implements situationally aware "experts", in the form of formulations (rules, heuristics, and calibrations) that control the software agents operating in the system. The overall result of the expert-based system, as realized by way of the formulations according to which these agents are configured, is to provide the human driller or drilling engineer at the drilling site with recommendations regarding the drilling process, based on recently acquired and processed measurement data and other measurements, and based on inferences and previously generated formulations. The expert-based drilling aspect of this invention ensures that the formulations used in connection with the drilling operation are up-to-date, and accurate.

Figure 10:
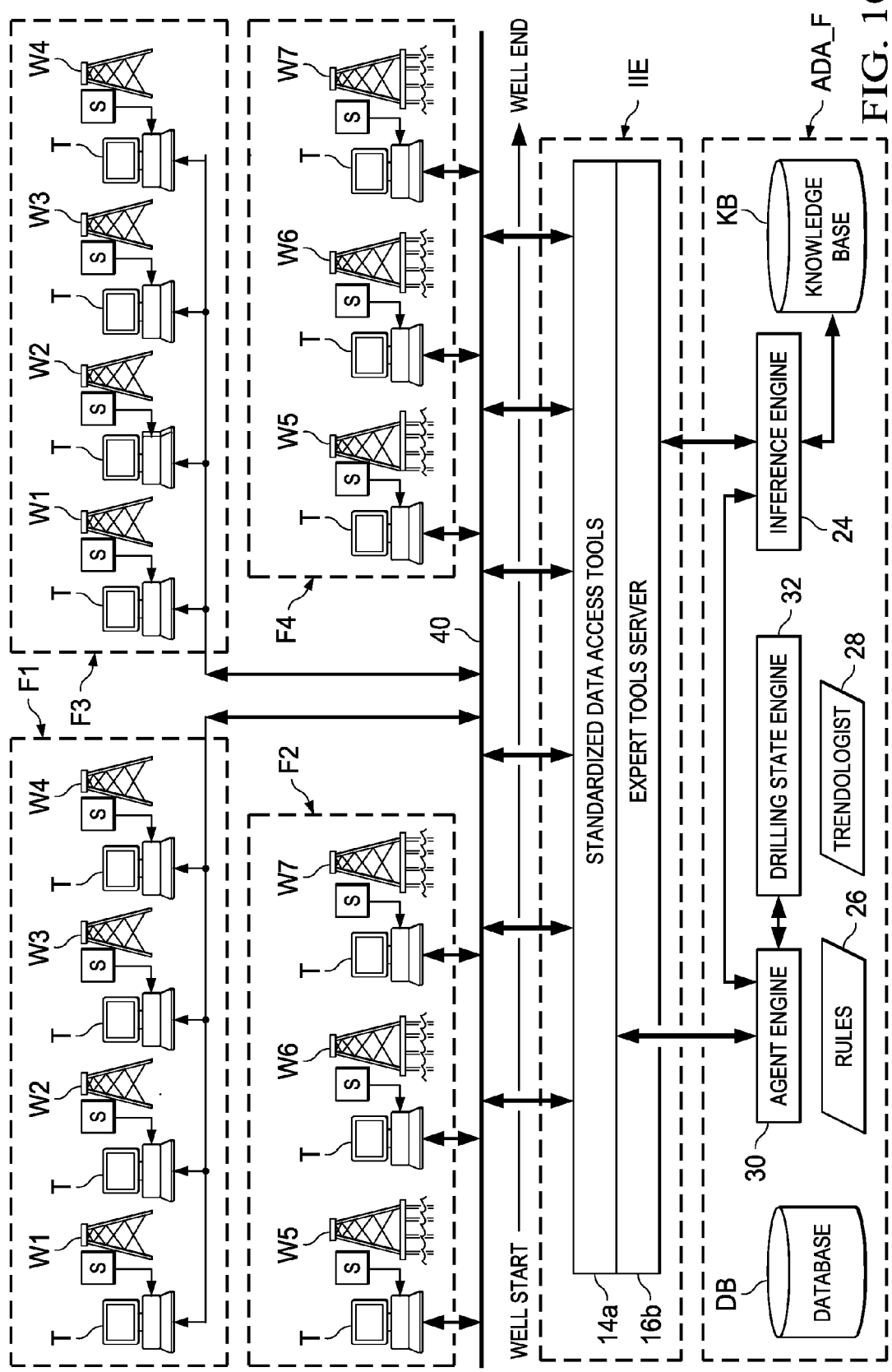
FIG. 10 is a schematic diagram illustrating the operation of software expert functions in assisting the drilling of a well according to an embodiment of the invention.

FIG. 10 illustrates the overall operation of expert-based drilling according to an embodiment of this invention, in connection with multiple drilling rigs W deployed in multiple fields F1 through F4. According to this aspect of the invention, inference engine 24 within formulator ADA_F determines the frequency and timing at which software agents are to be instantiated and forwarded to the various rig clients T, for purposes of acquiring specific measurement data and other information that may be useful in the updating or creating of formulations (rules, heuristics, and calibrations). This determination may itself be based on rules or heuristics that are developed and updated in response to current conditions and past history. In response to the determination by inference engine 24, expert tools server 16b configures and instantiates the appropriate software agents for gathering the data and information desired by inference engine 24, according to the current formulations for acquiring such data and information. By way of such instantiation, expert tools server 16b causes the appropriate one or more of rig clients T to execute those newly instantiated agents, to acquire the measurement data and information required by inference engine 24. These data and information may also include any "ignore" inputs issued by the driller or drilling engineer, and the recommendations and situations giving rise to those "ignore" inputs. The data acquisition software agents instantiated for this purpose are preferably sufficiently autonomous as to be self-terminating, upon completion of their data acquisition tasks in this instantiation.

Preferably, as indicated in FIG. 10, the timing with which these software agents are instantiated at rig clients T, for purposes of new or updated formulations, is based on a time sequence, rather than based on situational awareness as in the case described above relative to FIG. 6. This is because the creation or updating of rules, heuristics, and calibrations is not considered to be a real-time operation. Rather, the creation and updating of formulations can be performed on a periodic basis, with the gathering of data performed as a scheduled process between formulator ADA_F and rig clients T.

From the standpoint of the acquisition of the measurement data and other information via the agents controlled by expert tools server 16b, the sources of that data and other information need not be the same sources as used in the determination of current conditions and recommendations, as discussed above relative to FIGS. 6 through 9. However, the measurement data acquired in connection with the creation and updating of formulations, as shown in FIG. 10, are preferably processed, conditioned, and formatted by data access tools 14a, including data grinders 44 (FIG. 8) and trendologist 28 as described above, to facilitate the drawing of inferences and accurate determination of new or updated formulations. The processed and conditioned data provided by data access tools 14a in information integration environment IIE are then forwarded to agent engine 30, which in turn forwards the received data and any necessary software agents to inference engine 24. Inconsistencies in these rules by the inference engine can be detected by a "consistency enforcer" function within inference engine 24; in the event of a detected inconsistency, inference engine 24 preferably uses its adaptive capability to heuristically derive a potential new rule set. Inference engine 24 operates upon the newly received processed data, in combination with previous formulations and other information stored in knowledge base KB, to create new and updated formulations, including rules and heuristics. Another type of formulation that may be created by inference engine 24 in connection with this aspect of the invention is a calibration, by way of which measurement data from one or more sensors S or other data sources may be calibrated with respect to other measurement data, or with respect to inferences or conclusions or recommendations previously reached, thus improving the precision and fidelity of the operation of this system.

Figure 11:
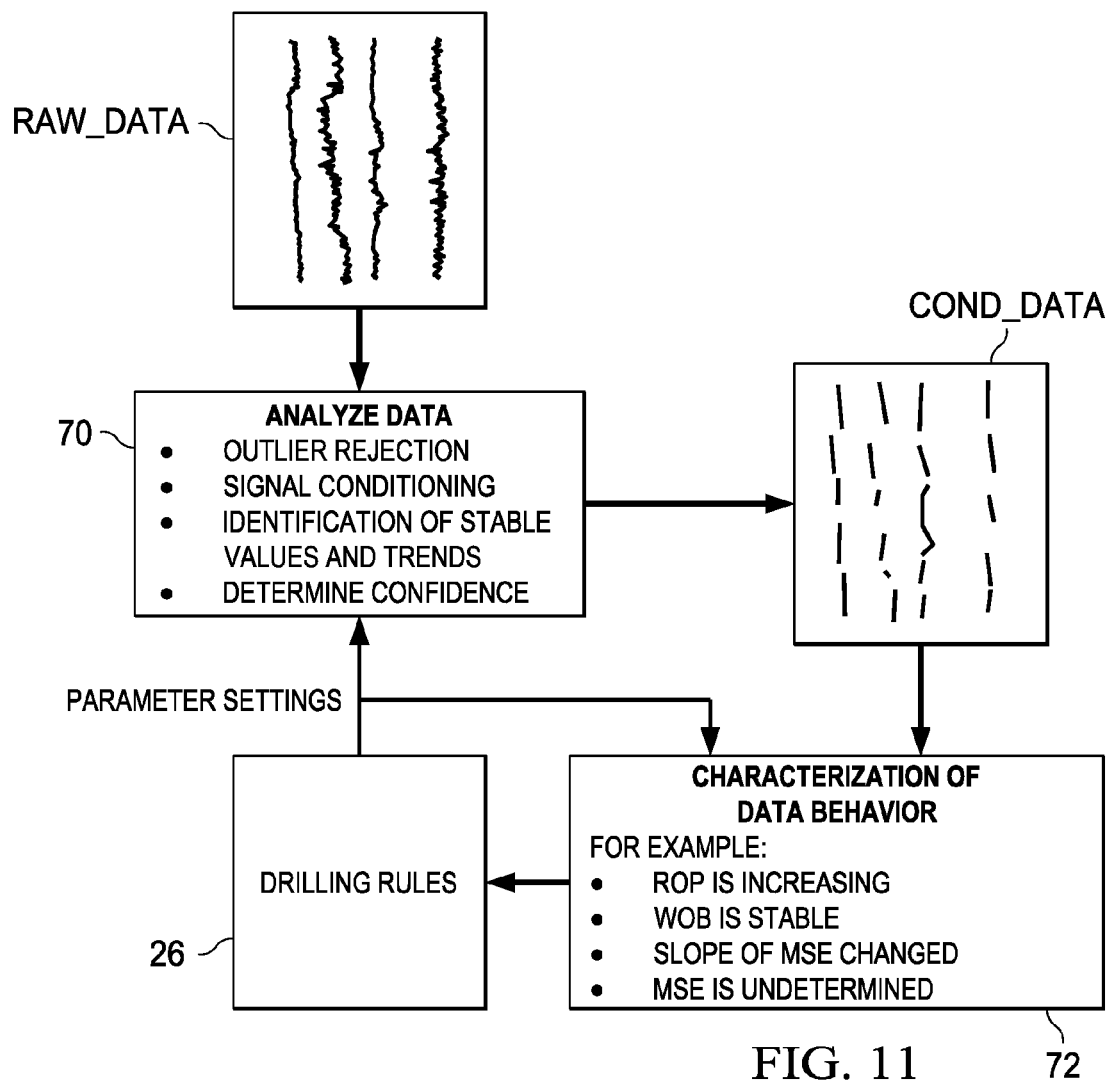
FIG. 11 is a flow diagram illustrating the operation of the software expert functions in modifying formulations according to an embodiment of the invention.

A generalized flow of the operation of inference engine 24 in updating drilling rules, in its creation of new and updated formulations, is shown by way of example in FIG. 11. Measurement data RAW_data acquired from multiple data sources at drilling rig W1, including sensors S via the data acquisition system at rig client T1, are applied to data conditioning process 70. Process 70, which is performed by trendologist 28 in concert with data grinders 44 in response to previously formulated rules selected by rules engine 26 as applicable to the current drilling state and situation, filter, processes, and conditions measurement data RAW_data according to the nature of the measurements, the signal and data quality, and the like, as discussed above. FIG. 11 illustrates, in connection with process 70, examples of the conditioning applied in this example, including rejection of outlier values, signal conditioning through the application of low-pass filters and other signal processing functions, identification of stable values and trends, and the determination of confidence intervals. Of course, additional or fewer processes may be applied to measurement data from the various data sources represented within measurement data RAW_data. The result of process 70 is conditioned dataset COND_data. Dataset COND_data is then characterized by inference engine 24, in process 72, to create inferences from the conditioned data. As shown in FIG. 11, examples of inferences that can be drawn from this characterization include increasing rate-of-penetration, stable weight-on-bit, changes in the slope of Mechanical Specific Energy (MSE), and whether the MSE value is determined or undetermined. These characterizations of dataset COND_data, in combination with other information including drilling state and measurement data history, lithology models, and the like are then used by inference engine 24 to create or update drilling rules, and to store the result in knowledge base KB. These new and updated drilling rules are then used to change the parameters applied to newly-received measurement data and other information (in process 70), and also in the characterization of conditioned data in process 72, as shown in FIG. 11. This process continues over time for each drilling rig W to which the system of this embodiment of the invention is applied.

Expert-based drilling according to this embodiment of the invention thus provides a mechanism by which situationally-aware expert software functions can control software agents that interact among multiple software servers and hardware states to provide recommendations to human drillers in the drilling of a borehole into the earth at a safely maximized drilling rate. These expert software functions dispatch the agents, initiate transport of remote memory resources and provide transport of knowledge-base components including formulations (rules, heuristics, and calibrations), according to which a drilling state or drilling recommendation is identified responsive to sensed drilling conditions, in combination with one or more parameters indicated by a lithology model of the location of the drilling rig, and in combination with operational limits on drilling equipment sensor parameters. These software experts develop formulations applicable to the drilling site derived from the knowledge base, and transmit those formulations, via an agent, to a drilling advisor client system located at the drilling site. That client system including the drilling advisor function is coupled to receive signals from multiple sensors at the drilling site, and is coupled to the servers within the information integration environment to configure and service the software agents.

In this manner, the expert-based drilling aspect of this invention enables the overall system to continue to improve the accuracy of its inferences and recommendations, as well as improve the confidence with which those inferences and recommendations are drawn, by periodic or otherwise repeated updating of its rules and heuristics. The expertise of the overall system therefore improves over time, and with additional information from each drilling rig W and from other drilling rigs W and production fields F. The instantiation or creation of software agents is thus improved with continued operation over time, as these newly instantiated agents can be configured with these updated formulations.

Knowledge-Based Drilling

Figure 12:
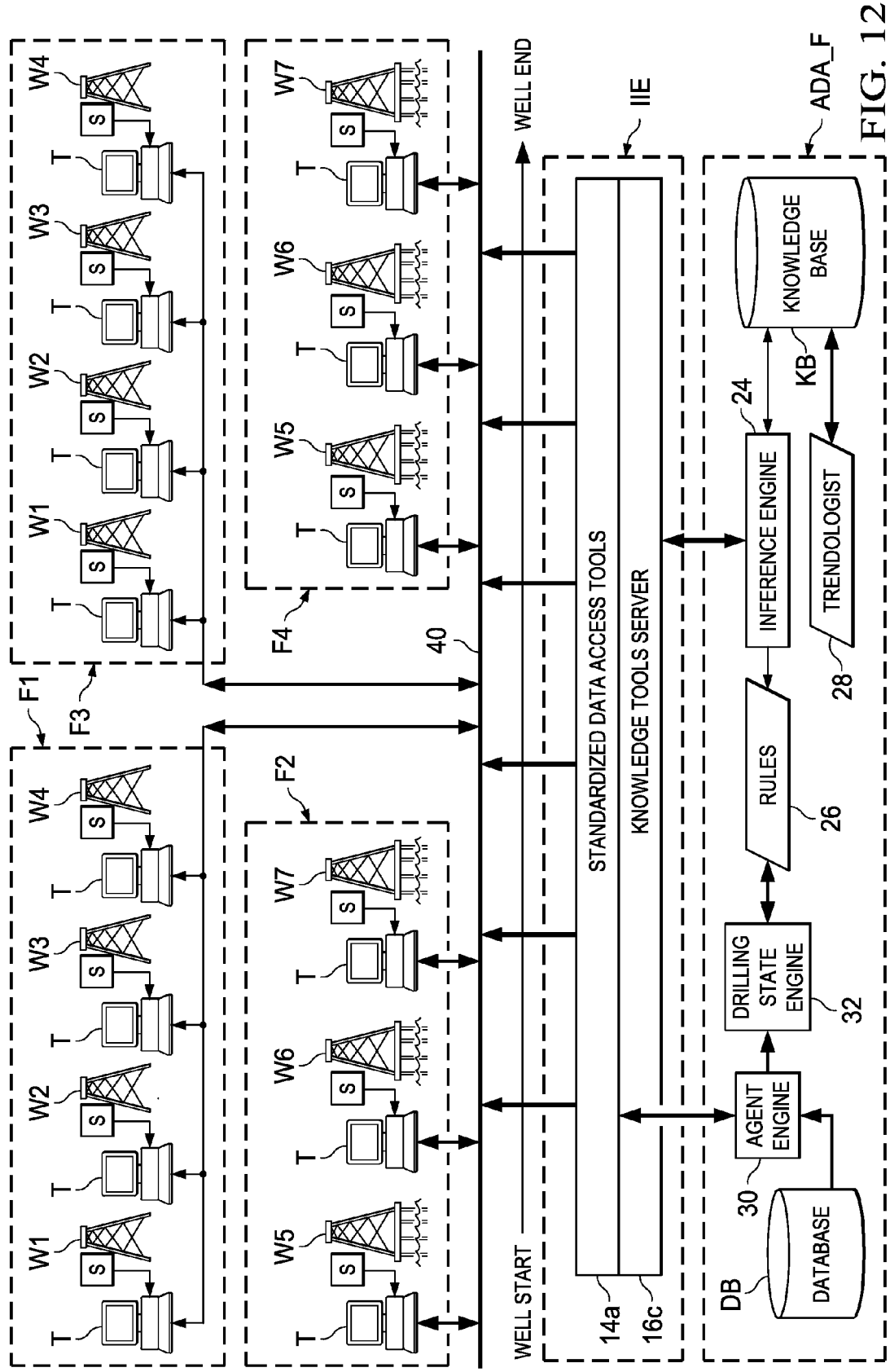
FIG. 12 is a schematic diagram illustrating the operation of knowledge-based aspects assisting the drilling of a well according to an embodiment of the invention.

As described above, the system of this embodiment of the invention operates to acquire measurement data and other information from one or more drilling rigs W in one or more production fields F, and to provide information back to the driller or drilling engineer based on that data and information, using previously-derived formulations and information from other wells. This information includes recommendations to the driller or drilling engineer regarding the way in which the drilling operation ought to be carried out, including suggested adjustments or changes in the operations carried out at drilling rig W. According to another aspect of the invention, the optimized manner in which the drilling operation is carried out is determined by the system itself, according to a notional "best well" model. This best well model is determined, according to this aspect of the invention, using recently and previously acquired measurement data, in combination with determinations of the current drilling state and also in combination with the lithology model and other information acquired or derived extrinsically from the data acquired at drilling rig W itself. The creation and updating of formulations according to this notional "best well", and the forwarding of the software agents including formulations corresponding to that best well model, will now be described with reference to FIG. 12.

As mentioned above, inference engine 24 creates the formulations (rules, heuristics, and calibrations) that are applied by way of software agents instantiated by information integration environment IIE and executed at rig clients T. According to this embodiment of the invention, these formulations created by inference engine 24 are directed toward an optimal notional "best well" model, specific to each drilling rig W in each of the production fields F supported by the system.

A wide range of information sources are available to inference engine 24 in its creation of this "best well" model. For the example of the creation of a best well model for drilling rig W1 in field F1, knowledge base KB includes "best well"

models created for other drilling rigs W2 through W4 within the same production field F1, as well as models created for other drilling rigs W in the other fields F2 through F4, and perhaps even prior wells in other fields not being currently supported by the system. The formulations in these previous well models are based on the measurement data and lithology models for the wells at those locations, and recommendations made by the system during the drilling of those models, but also preferably include responses from the driller or drilling engineer in response to those recommendations, as well as verification or adjustments made by off-line human experts by way of remote administrators RA (FIG. 5). In addition, the best well model for drilling rig W1 will also be based on the measurement data previously acquired during the drilling performed so far at that location (stored in database DB and forwarded by agent engine 30), trends of those measurement data as created by trend agent A_T (FIG. 8) based on trendologist function 28, the drilling state history as determined by drilling state engine 32, and well parameters WP1 (FIG. 3) and well properties WP2 stored at rig client T1 for drilling rig W1. An important input from well properties WP2 into inference engine 24 is, of course, the lithology model to which well properties WP2 at rig client T1 link, as this model provides insight into upcoming layers to be encountered in the drilling. "Ignore" inputs issued by the driller or drilling engineer in response to recommendations suggested by the system, and the situations giving rise to those "ignore" inputs, constitute quite useful information in the deriving of a best well model.

The result of the operation of inference engine 24 in creating these new or updated formulations is a "package" of formulations pertaining to the operation of a drilling rig W. An exhaustive list of these formulations cannot possibly be presented in this specification, given the wide variation of conditions and situations encountered in the drilling of even a single well, much less considering the variations of such conditions and situations over multiple wells in multiple different locations and production fields. As such, only examples of such formulations will be provided in this specification. One such example of such formulations is a set of limits (maximum, minimum) on various bottom-hole assembly (BHA) parameters, such limits defined by inference engine as ranges of values within which drilling will be optimized (e.g., based on rate of penetration) within the current layer, or more specifically at the current depth within the current layer. Another example of such formulations may include BHA limits and also limits and recommendations on other parameters that are optimized to avoid a "washout" in an upcoming layer; these recommendations can include not only an action, but a recommended time or depth at which the action is to be taken. In this manner, it is contemplated that the "best well" model includes those rules and heuristics, based for example on the lithology model and current trends in various parameter measurements, that define preventive action to be taken by the drilling rig in advance of unstable or dangerous situations that are due to arise in upcoming layers of the earth. These and other formulations are contemplated to constitute the "package" of formulations corresponding to a "best well" model applied to a given drilling rig W.

It is contemplated that the creation of such a best well model, by inference engine 24, can be performed according to any one of a wide variety of "artificial intelligence" techniques. For example, inference engine 24 may be in the form of a "neural net", in which a collection of inputs are applied to a network of weighted sum functions, to derive a set of outputs. As known in the art, such neural nets are trained by the application of many training sets of inputs to an initial net, evaluation of the result of the net against a known or desired output value set, and back-propagation through the net to adjust the various weighting factors. Alternatively, inference engine 24 may be arranged to implement a more rigorous set of logical rules to implement the best well model in optimizing one or more measurement criteria, with additional information and instances used to modify the logical rules or to create additional rules and logical conditions. Still further in the alternative, inference engine 24 may realize its formulations by use of heuristics, according to which a "softer" result with confidence intervals and the like can be created from a simplification of the overall optimization problem. It is contemplated that those skilled in the art having reference to this specification will be readily able to realize inference engine 24 according to one or more of these or other known artificial intelligence techniques, without undue experimentation.

Upon creation of new or updated formulations, inference engine 24 stores the new or updated rules in knowledge base KB, for use by other functions in formulator ADA_F such as drilling state engine 32. In addition, these new or updated formulations are then forwarded to knowledge tools server 16c within information integration environment IIE. Knowledge tools server 16c then configures software agents with the new or updated formulations corresponding to the "best well" model derived by inference engine 24, as discussed above. These software agents are then instantiated by information integration environment IIE (e.g., agent access server 16a), and are "pushed" to one or more rig clients T in the supported production fields F to which the new formulation is applicable. In particular, it is contemplated that display agents A_D (FIG. 8) will generally be the agents that are configured with the new formulations according to the "best well" model, as display agents A_D are the actors that present drilling recommendations to the driller or drilling engineer. However, it is contemplated that other agents, including trend agents A_T and also data acquisition agents A can also be modified according with the new or updated formulations. For example, different data sources may become of interest as a result of the updating of the drilling formulations, in which case new data acquisition software agents A_D are instantiated and forwarded to rig client T. The software agents configured according to these new or updated formulations are preferably "pushed" to rig clients T in a planned manner, rather than on an immediate basis. This permits updated software agents to be instantiated at rig clients T at safe times from a computer update standpoint, rather than in the midst of critical processing and drilling operations, so that any issues or errors caused by such updating do not cause a failure of the drilling operation. Of course, once the new software agents configured according to the new rules, heuristics, and calibrations are instantiated at rig clients T, execution of these new agents and operation of the overall system proceeds, according to the approach described above.

According to this aspect of the invention, the knowledge-based drilling feature in this embodiment organizes, validates and dispatches collection agents for all notional "best wells" for all fields based on all available information for that field. This available information includes historic, real time, and/or near-real-time depth or time based values in any format of drilling dynamics, earth properties, drilling processes and driller reactions. In effect, the inference engine operates according to a virtual, heuristic ontology that automatically extends based on the environment sampled, encapsulates rules about the "how" to drill the "best well", "when" to push toward the maximum operating parameters of the drilling rig, and "why" to react ahead of the driller's perception of an impending down hole vibration event. As a result, the drilling knowledge base KB suggests solutions to problems based on feedback provided by human experts, learns from experience, represents knowledge, instantiates automated reasoning and argumentation for embodying best drilling practices into the "best well".

The ability of the system according to this embodiment of the invention to create formulations that are directed to the drilling of an optimal "best well", responsive to a wide range of information, including measurement data, lithology models, results obtained from other wells, and responses from human drillers to previous recommendations, all subject to verification by off-line experts via remote clients, is contemplated to provide accurate and intelligent guidance, in real-time, to the drilling process. This guidance is provided by the system in real-time, in the sense that the mentoring and advising is provided by the system itself based on its knowledge base, rather than requiring remote analysis and consideration by a human user. Indeed, it is contemplated that this knowledge-based drilling approach, according to this embodiment of the invention, can enable less-experienced drillers to attain more success in drilling oil and gas wells, earlier in their careers, by providing an automated intelligent expert guide to assist the likelihood of success.

Examples of Operation

Various examples of the operation of the system according to the described embodiments of the invention will now be described. These examples are intended to be illustrative of certain situations that can be encountered both in drilling a wellbore and also in managing the operation of the wellbore in the event of lost circulation of drilling mud. Those of ordinary skill in the art having reference to this specification will readily recognize, of course, that the system according to these embodiments of the invention is capable of similar operation in providing recommendations and information to decision-makers at the drilling rig in connection with a wide range of other events and situations. As such, it is contemplated these examples described in this specification will be understood merely as illustrative examples, and will also be understood as not limiting of the full scope of this invention as claimed.

Figure 16:
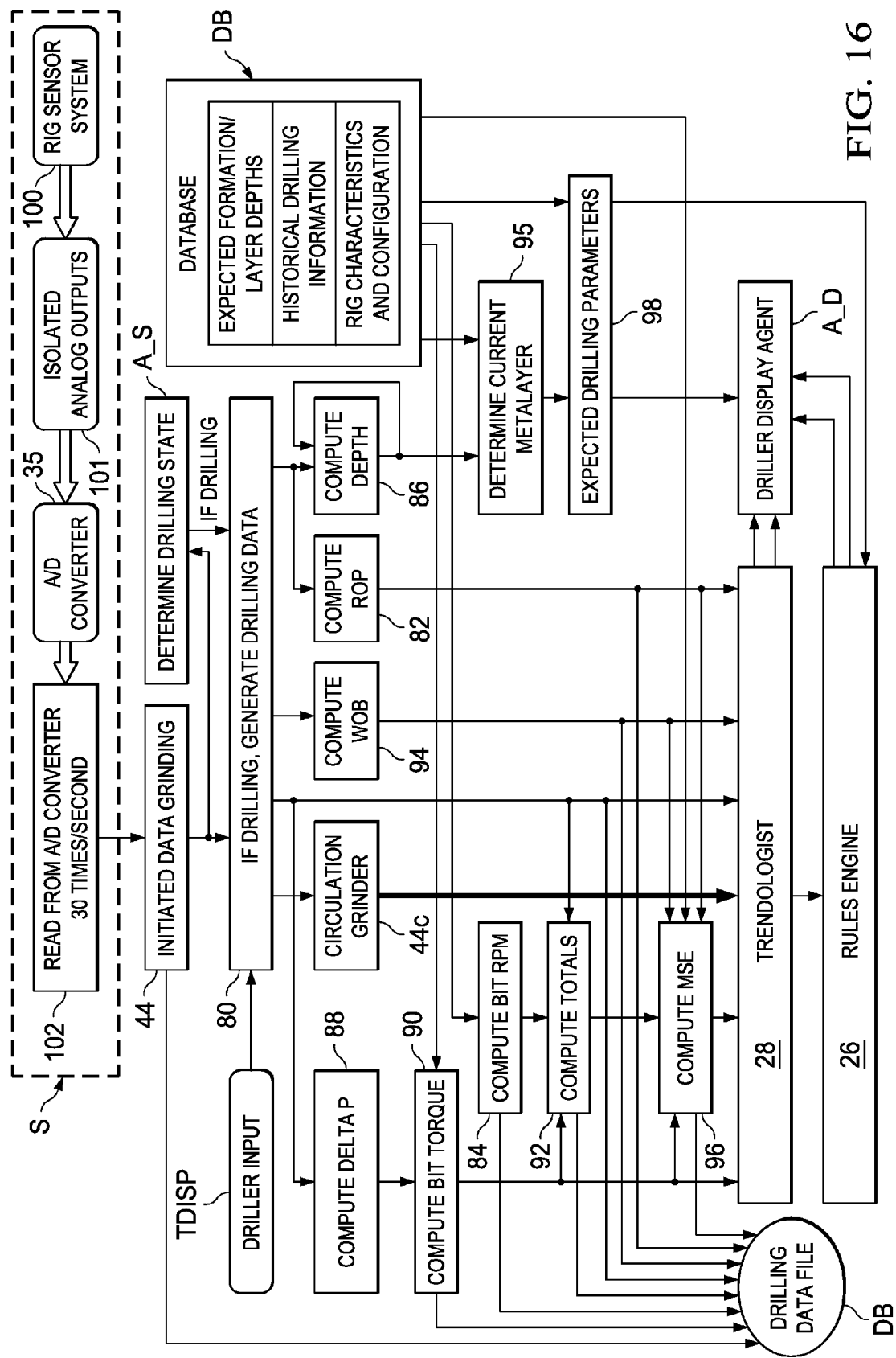
FIG. 16 is a flow diagram illustrating a generalized example of the operation of embodiments of the invention.

FIG. 16 illustrates the overall operation of the system by way of examples of processes carried out by software agents and other components of the system, operating within the multi-level system of rig clients T, information integration environment IIE, and formulator ADA_F. The processes and functions illustrated in FIG. 16 are those that are contemplated to be useful in connection with a wide range of situations and events in the drilling operation. However, in the spirit of the immediately previous paragraph, it will be understood that these processes are illustrative examples, and are not intended to limit or otherwise exclude other processes and functions carried out by this system.

FIG. 16 illustrates the acquisition of current real-time sensor information from sensors S at drilling rig W1, in one of production fields F. Rig sensor system 100 at drilling rig W1 refers to an entire set of measurement sensors S1 through Sn, which generate set 101 of isolated analog outputs corresponding to various physical measurements and properties. Isolated analog outputs 101 are digitized by analog/digital converter functions 35 in data acquisition systems (not shown) at or near drilling rig W1, and these digital data are read by data acquisition software agents in process 102 at a desired frequency (e.g., 30 Hz, as shown in FIG. 16). The particular sensors S from which data are acquired, as well as the frequency of such acquisition etc., are determined in a situationally-aware manner, as described above, based on which particular data acquisition software agents are instantiated and the particular configuration of those agents.

As described above in connection with FIG. 8, the sensor data acquired by data acquisition software agents A1 through An are forwarded to data grinders 44. The initiation of data grinders 44 is illustrated in FIG. 16. As described above, data grinders 44 filter and otherwise process newly acquired measurement data in concert with trendologist 28, in a situationally aware manner according to various rules, heuristics, and calibrations derived for the current drilling state of drilling rig W1 and other parameters; in addition, as described above, the extent of filtering and other processing applied to these data is dependent on which sensor S is providing the measurements, as well as the nature and quality of those measurements. These processed measurement data are stored in a drilling data file in database DB. In addition, some or all of these processed measurement data are obtained by drilling state agent A_S, which determines the particular drilling state of drilling rig W1 as described above. If the current drilling state corresponds to a state in which active drilling is being carried out, then process 80 is performed by another instantiated software agent, to generate various drilling data according to the rules, heuristics, and calibrations for which that software agent has been configured. These drilling data are then forwarded to trendologist 28, as shown in FIG. 8, for combination with other measurement data and other information, and are forwarded to other software agents and other functions to carry out the processes illustrated in FIG. 16. According to this embodiment of the invention, the various software agents performing the processes shown in FIG. 16 may be resident and executing within rig client T1 at the site of drilling rig W1, or some (or all) of these software agents may be distributed around the network, for example within information integration environment IIE, depending on the computational capability of the hardware realizing the overall system.

For the case of the current state of drilling rig W1 determined to be one of the drilling states, process 80 is performed by a corresponding software agent to generate various data corresponding to the drilling operation, as determined by the various formulations according to which the software agent is configured. The generated data are forwarded to trendologist 28 for combination with other data and information, as shown, and also to other processes and functions. For example, data grinder 44c can receive those drilling data that correspond to the circulation of drilling mud; data grinder 44c will filter and otherwise process those data according to the operative rules and heuristics, and forward those processed circulation to trendologist 28 for combination with other data and information. The other functions receiving drilling data resulting from process 80 include software agents for computing the rate of penetration in process 82, for computing the current depth of drilling in process 86, for computing bit RPM in process 84, for computing the surface versus downhole pressure in process 88, for computing bit torque in process 90, and for computing weight-on-bit in process 94. The software agents carrying out these processes also forward their respective results to trendologist 28, for combination with other data and information, and in some cases to software agents for computing other results in other processes in this overall system. The software agent performing process 84, in which bit RPM is calculated, as well as other agents computing other results, also receive information from database DB regarding the expected formations and layers to be encountered, historical drilling information, and rig characteristics and configurations, as linked to by the various well parameters WP acquired by corresponding data acquisition software agents executing at drilling rig W1, as described above. Many of these processes also forward their results for storage in the drilling data file within database DB, as shown in FIG. 16.

Other software agents carry out downstream processes to compute other information and data based on the results from the processes described above that receive the drilling data from process 80. These other processes can include such computations as process 92, in which a software agent executes the computation of various totals of other computed parameters (bit torque, RPM, etc.), and process 96 in which a software agent utilizes various parameters from other upstream processes (including process 92) to compute the mechanical specific energy (MSE) of the drilling operation. These computed results and other data are forwarded to trendologist 28 for combination with other data and information.

A software agent is also instantiated to determine the current "metalayer", in process 95; as described above, a "metalayer" refers to an abstraction of properties for a layer in the subsurface, such properties including material properties, the depth at the top and bottom interfaces of such a layer, as well as formulations (rules, heuristics, and calibrations) indicating the "best" way to drill through the layer. Process 95 utilizes both the depth data from process 86, as well as information regarding the metalayer from database DB, and forwards these results to a software agent that is performing process 98 to determine the expected drilling parameters for the current metalayer. These expected drilling parameters include the expected ranges for WOB, ROP, RPM, bit torque, delta pressure, and MSE, as well as the expected limits for WOB, RPM, ROP, and bit torque. These expected drilling parameters are forwarded to driller display agent A_D.

As mentioned above, trendologist 28, residing in formulator ADA_F, combines data and results from various sources, including from data grinders 44, and also from software agents that carry out various ones of the upstream processes as shown in FIG. 16. Trendologist 28 combines these data and results, according to the currently-applicable rules, heuristics, and calibrations, to determine current values of parameters that it determines to be useful to the driller or drilling engineer in the current state of drilling rig W1, and also trends of those parameters, scaled and processed in a manner that it determines to also be useful to the driller or drilling engineer in the current state of drilling rig W1. Those values current values and recent trends are forwarded to driller display agent A_D that is instantiated and executing at rig client T1. The trends of parameters derived by trendologist 28 are also forwarded to rules engine 26.

Rules engine 26, as discussed above, is a computational resource in the form of a software component executed by programmable processing circuitry within formulator ADA_F, that selects formulations (rules, heuristics, and calibrations) that are appropriate for a certain situation, and forwards those formulations to information integration environment IIE for configuration into software agents that apply those rules at rig clients T. In this example of FIG. 16, rules engine 26 receives indications of recent trends from trendologist 28 regarding calculated and measured drilling parameters, as well as the expected drilling parameters from process 98 regarding the current and upcoming metalayers that are being encountered. In response, rules engine 26 selects the rules, heuristics, and calibrations that are suitable for configuring software agents, executable at rig client T1, that determine the recommended drilling parameters and recommended actions, which are displayed via driller display agent A_D at touchscreen display TDISP at rig client T1.

In response, as mentioned above, the driller or drilling engineer can provide an input via touchscreen display TDISP. This input itself becomes input data that is considered and processed by the system in determining new or updated recommendations or actions, or indeed in determining new or updated formulations for use in generating recommended actions not only at drilling rig W1, but for other drilling rigs W current operating or operating in the future. As shown in FIG. 16, these inputs (especially an "ignore" input by way of which the driller or drilling engineer chooses to not follow the displayed recommendation produced by the system) are forwarded from touchscreen display TDISP to process 80, by way of which a corresponding data acquisition agent inserts that input into the overall data processed and considered by the system according to this embodiment of the invention.

Examples of Operation in Drilling

Figure 17:
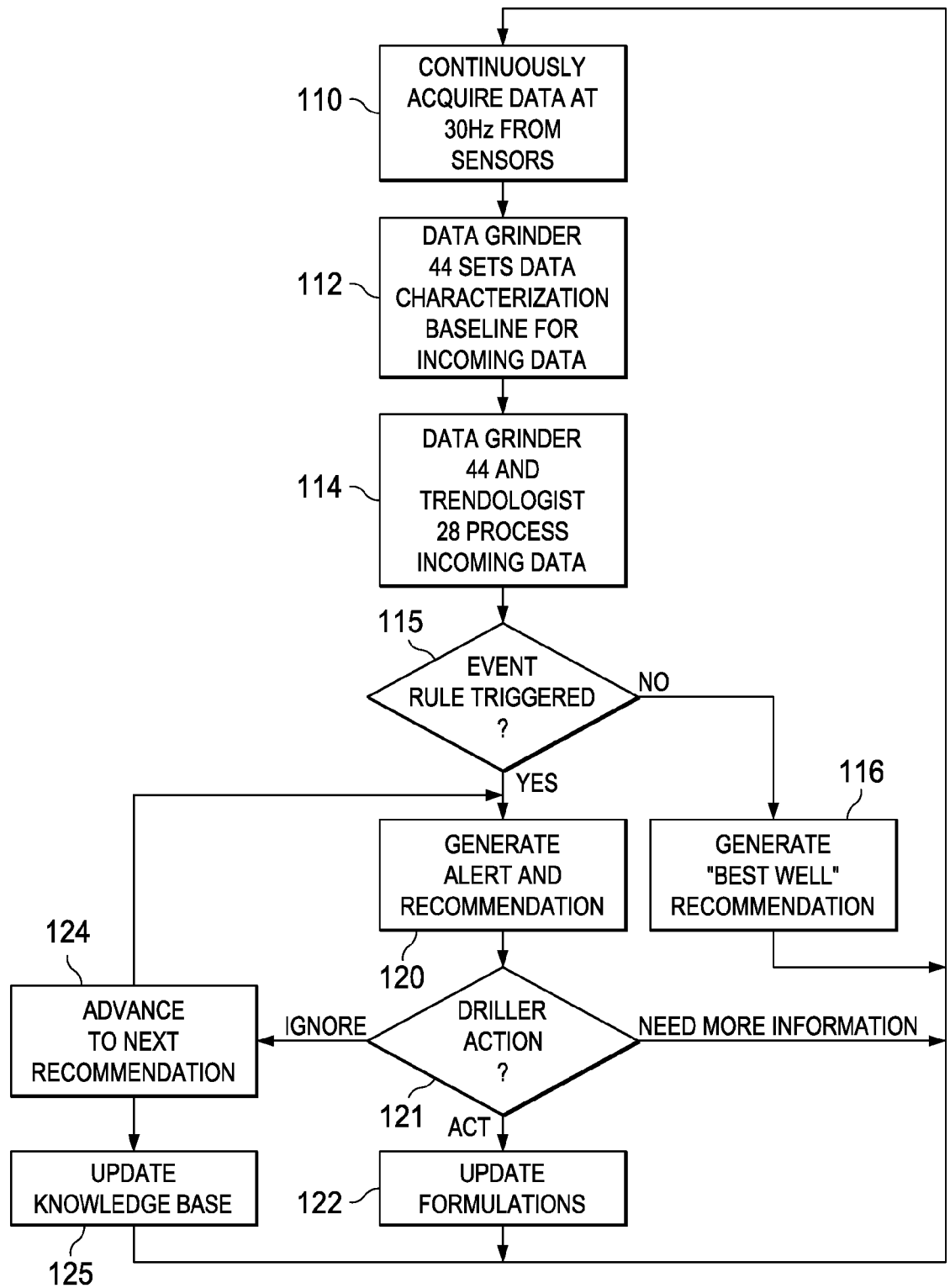
FIG. 17 is a flow diagram illustrating specific examples of the operation of embodiments of the invention.

Referring now to FIG. 17, an example of the operation of an embodiment of the invention in a more specific case of detecting and responding to a drilling dysfunction, specifically a downhole vibration event, will now be described in further detail. As shown in FIG. 17, and as described above relative to FIG. 16, measurement data is acquired from sensors S at drilling rig W1 on a substantially continuous basis, for example on the order of thirty data measurements per second from each of the various sensors S, in process 110. As described above, these data are acquired by data acquisition software agents at rig client T1, such agents having been instantiated and configured by information integration environment IIE. In process 112, one or more data grinders 44 initiate filtering and other processing of these measurement data acquired in process 110. As described above, the extent of filtering and processing of these data applied by data grinders 44 is determined by formulations from knowledge base KB, as applied by rules enforced by trendologist 28, and are specific to the nature and quality of the measurement data for each data source (e.g., each sensor S). In this example, the combination of trendologist 28 and data grinders 44 configures and controls a baseline for characterization of the incoming measurement data. In process 114, data grinders 44 and trendologist 28 continue processing the incoming data relative to this characterization baseline that was set in process 112, with the baseline and other processing parameters subject to modification as indicated by rules engine 26 in a situationally-aware manner. Also in process 114, trendologist 28 combines the processed data from the various data sources, and applies these data to software agents configured by rules engine 26 to determine whether any one of a number of potential events, such as changes of drilling state or indication of a drilling dysfunction are indicated by the processed data.

Decision 115 is executed by one or more software agents in the system in applying the previously derived and stored formulations for detecting dysfunction events. In this specific example, a dysfunction event rule is triggered, more specifically by detecting conditions (indicated by the processed measurement data as combined by trendologist 28) that a rule set or heuristic recognizes as being indicative of a downhole vibration event. An example of a formulation indicating a downhole vibration event is the combination of the following detected situations:

MSE having a large value (exceeding a limit);
ROP having a small value (below a minimum limit);
ROP decreasing with respect to time;
Bit torque fluctuating (deviation over time exceeding a limit); and
RPM fluctuating.

In the example of FIG. 17, the drilling vibration dysfunction event is triggered by this combination of detected measurement data conditions (decision 115 is YES). As discussed above, a software agent at rig client T1 has executed this determination, and communicates this condition to one or more other software agents, or to information integration environment IIE, which in turn communicates to display agent A_D at rig client T1 (or, alternatively, instantiates such a display agent A_D at rig client T1). Display agent A_D generates an alert of the detected vibration event at touchscreen display TDISP. Another software agent generates a recommendation for the driller or drilling engineer, regarding action to be taken to alleviate the dysfunction of downhole vibration that has been detected; display agent A_D presents this recommendation at touchscreen display TDISP. As noted above, FIG. 15 illustrates an example of the display at touchscreen display TDISP for a drilling dysfunction.

In decision 121, the driller or drilling engineer provides the system with an input corresponding to his or her response to the detected dysfunction event, preferably provided via touchscreen display TDISP. These inputs can be a request for more information ("need more info"), a decision to ignore the recommendation ("ignore"), or action taken on the recommendation ("act"). If the driller or drilling engineer requests more information, control returns to process 110 to acquire more information over time; in addition, the system can instantiate additional data acquisition agents to acquire different sensor signals and measurement data, if the formulations indicate such a response to the request for more information.

If the driller or drilling engineer decides to ignore the event and recommendation ("ignore"), process 124 can be optionally executed by a software agent at rig client T I to advance to a next recommendation, if the formulations provide such an option. If so, a new recommendation is displayed at touchscreen display TDISP for consideration by the driller or drilling engineer, as before. In any event, the "ignore" response to the recommendation is forwarded to the knowledge base KB in process 125, for example via inference engine 24 producing a new or updated formulation based on the "ignore" response. In effect, inference engine 24 defers to the decision of the driller or drilling engineer, and uses the intelligence provided by that human in updating formulations appropriate to the sensed current conditions.

If the driller or drilling engineer chooses to act on the recommendation, the current formulations are updated (or assigned a higher level of confidence) in process 122, comprehending the agreement or acquiescence of the driller or drilling engineer to the system recommendations. This action on the recommendation generally results in a change to the drilling parameters applied to the drill string. For example, in the event of a detected actual or imminent downhole vibration event, a recommendation presented in process 120 is to increase the RPM by 10%, and decrease WOB by 5%. Control then passes back to process 110, by way of which new measurement data are acquired in light of the change of drilling parameters, to determine whether the vibration has been resolved. The process then repeats from process 110, although the particular rule set evaluated in decision 115, or the recommendations to be presented in the event of continued dysfunction, may differ from those enforced previously.

In the example of FIG. 17, in this second pass through the process after the driller or drilling engineer has acted on the recommendation, if the downhole vibration is again detected in process 115 (YES), a new recommendation (e.g., set RPM to 70 and decrease WOB by 15%) is presented in process 120. Again, the driller or drilling engineer acts or ignores the recommendation, or requests additional information. The operation of the system continues in the manner of FIG. 17, with trendologist 28 continuing to combine and monitor the measured and processed data. Upon the dysfunction being resolved, a recommendation is presented to the driller or drilling engineer to resume normal drilling operations, at normal drilling parameters for the current and upcoming metalayers.

As noted above, decision 115 may indicate that, based on the processed and filtered measurement data and other information, no drilling dysfunction is present or imminent. This situation is, of course, indicated by decision 115 returning a NO result. This condition corresponds to the processed measurement data and other information indicating that the drilling parameters are within their normal or nominal ranges, or more generally that none of the rule sets or formulations detect the combination of measured parameters, trends, and other conditions that, according to the knowledge base KB, indicate actual or imminent dysfunction. In this situation, one or more software agents execute at rig client T1 to provide recommendations toward optimizing the overall drilling process, based on the "best well" model derived according to the knowledge-based drilling approach described above. These recommendations are presented in process 116, for potential action by the driller or drilling engineer. In particular, it is contemplated that this "best well" approach in the absence of dysfunction will be especially useful in improving the rate of penetration attainable by a relatively inexperienced driller or drilling engineer, without requiring a human with more experience to be present at the drilling rig W1.

According to this embodiment of the invention, this drilling optimization approach (decision 115 is NO) can recommend an increase in certain drilling parameters, such as WOB and RPM, by an amount that intends to incrementally increase the rate at which the wellbore is being drilled. Process 110 and subsequent processes in the approach of FIG. 17 are then repeated, and the measurement data again processed and analyzed relative to the applicable formulations. For example, after a time interval at the new increased drilling parameters, and if no dysfunction is then detected, a new "best well" recommendation can be presented in process 116, for example to again increase the WOB and RPM in an effort to incrementally increase the rate of drilling progress. The process is then again repeated, until a limit of some type is reached, or a new metalayer is encountered.

Example of Operation in the Event of Lost Circulation

Similarly, the process illustrated in FIG. 17 is applicable to other operational events. A particularly important example of such events is "lost circulation", which refers to an event in which drilling mud injected into the wellbore is not returning to the surface, at least in the quantity expected relative to that injected. In this event, the "best well" model includes formulations capable of inferring a wide range of downhole events, including lost circulation, for the sequence of metalayers defining the wellbore that is being drilled by drilling rig W1. In this case, data grinders 44 include one or more "circulation" data grinder instances (data grinder 44c in FIG. 16) that process and forward measurement data to trendologist 28, for application to rules engine 26 so that software agents can be instantiated and configured to determine the state of drilling mud circulation within drilling rig W1. The particular formulations (rules, heuristics, and calibrations) contemplated to be applicable for evaluation of drilling mud circulation include situationally-aware formulations that are depth, time, and event based, for configuration into the appropriate software agents. Preferably, these formulations are based on models that incorporate the lithology models for the metalayers along the wellbore to the extent previously drilled, and based on the depths and thicknesses of those metalayers, as well as upon other factors such as the makeup of the drilling mud, and the like.

With reference to FIG. 17, an imminent or actual lost circulation event is detected by predictive rule sets or heuristics that are predicting an amount of lost drilling mud beyond a particular limit, at a particular depth (e.g., >200 barrels at a depth of 8600 feet from the surface). If the measurement data processed in processes 112, 114 indicate drilling mud lost beyond this volume at that depth, an event rule is triggered (decision 115 indicates YES), causing one or more drilling agents and display agent A_D at rig client T1 to display a "lost circulation" alert at touchscreen display TDISP, and to derive and present a recommendation to the driller or drilling engineer, in process 120. For example, this recommendation may include a suggestion for a "pill" treatment to the drilling mud; preferably, the driller action at decision 121 provides an input to touchscreen display TDISP by way of which the driller or drilling engineer can provide such an input to the system. In the event that action is taken ("act" in FIG. 17), the process is repeated based on the predicted result of the treatment applied, the time line of the treatment impact and affected metalayers, newly acquired measurement data, and other information, beginning with process 110, resulting in a new prediction if applicable. For example, such a new prediction can incorporate the previous prediction and a model of the effect of the treatment implemented, such as a prediction of the loss of another 100 barrels of drilling mud by the time that the wellbore reaches a depth of 9200 feet. If decision 115 indicates that this rule set is triggered (e.g., more than 100 more barrels of mud lost), a new recommendation (e.g., increase drilling mud weight by including a volume of walnuts) may be displayed in process 120, and a new input received from the driller or drilling engineer in decision 121 as before. The process repeats until the circulation loss event is no longer detected.

In a more general sense, the drilling mud circulation monitoring and evaluation implemented by the system according to these embodiments of the invention utilizes the stored formulations in connection with the "best well" model to evaluate the likely causes of lost circulation, and the most effective protocol of corrective actions. The functions described above in connection with the optimization of the drilling operation are similarly applicable and useful in the circulation function, including use of the trendologist function to optimally process measurement data from each data source, and to display and analyze that data with a sensitivity most appropriate for the current and upcoming situations. In addition, the "best well" model also preferably includes a model for deriving circulation parameters and limits, using the lithology model for the sequence of metalayers that have been encountered and that will be encountered. It is contemplated that this operation will derive a depth and layer dependent model that accurately predicts expected drilling mud loss at various depths through the layers, so that true lost circulation events can be accurately detected, diagnosed, and resolved in an expeditious and effective manner. For example, inference engine 24 of formulator ADA_F preferably accesses knowledge base KB of formulator ADA_F to acquire symbols that are based on the facts and assertions applied in this optimization of the drilling operation, and accesses data base DB to acquire data that is or may be applicable to given drilling rig W1 (e.g., including its mud pump type, drilling mud system, drill bit being used, formations, etc.). Rules engine 26 then examines the existing set of rules to determine which rules may be relevant to the circulating state, so that the proper rule sets or heuristics can be applied to the monitoring of circulation.

It is further contemplated that the formulations (rules, heuristics, and calibrations) applied for lost circulation will also be adaptively generated and updated throughout the operation of the system, beginning with models for other drilling rigs and adaptively managed and updated for the current wellbore.

In Conclusion

As evident from this description, this invention provides important benefits in the automation of intelligent assistance in the drilling of a wellbore, typically for the production of oil and gas from the earth, both in a land-based and offshore context. System-wide expertise regarding the drilling of the optimum well in a particular location, as well as the detection and resolution of drilling or circulation dysfunction, can also be intelligently and adaptively derived and applied. Indeed, it is contemplated that the system of this invention will have the capability of identifying relationships and dependencies not previously known, thus extending the expertise of drillers with long experience beyond specific wells and into more general cases. As such, it is contemplated that less-experienced drillers and drilling engineers will especially benefit, as they will have automated and user-friendly access to the recommendations of experts and expert systems. Experienced drillers will also benefit, especially in drilling wellbores in new environments. Accordingly, it is contemplated that this invention enables the more efficient, effective, and successful drilling of hydrocarbon wells throughout the world.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

What is claimed is:

1. A method of assisting drilling of a borehole at a drilling site, comprising:
    identifying, at a first computer system, drilling conditions at the drilling site, the drilling conditions comprising at least one of a parameter indicative of a layer of the earth in which the drilling occurs and a parameter indicative of at least one item of drilling equipment used in the drilling;
    identifying, at the first computer system, at least one software agent having one or more formulations applicable to the drilling conditions at the drilling site, wherein the at least one software agent is configured to utilize the one or more formulations to perform at least one of acquiring physical measurements during the drilling at the drilling site; forwarding the physical measurement to the first computer system; and providing a drilling recommendation at the drilling site;
    forwarding, by the first computer system, the at least one software agent to the second computer system at the drilling site, wherein the at least one software agent is configured to execute on the second computer system;
    receiving, at the first computer system, the physical measurements acquired by the at least one software agent executing on the second computer system;
    identifying one or more new formulations based on the physical measurements received from the at least one software agent; and
    modifying, by the first computer system, the at least one software agent to include the one or more new formulations.

2. The method of claim 1, wherein the at least one software agent is configured to utilize the one or more formulations to identify a drilling state in response to the physical measurements acquired by the at least one software agent.

3. The method of claim 1, wherein the parameter indicative of the layer of the earth is provided from a lithology model applied to the drilling site.

4. The method of claim 3, wherein identifying the drilling conditions at the drilling site comprises:
receiving, from the second computer system, links to a database in which parameters indicative of items of drilling equipment and the lithology model are stored; and
accessing the database to obtain the parameter indicative of the at least one item of drilling equipment and the lithology model.

5. The method of claim 1, wherein the at least one software agent is configured to process the physical measurements depending on a noise level within the physical measurements.

6. The method of claim 5, wherein the at least one software agent is configured to process, separately, portions of the physical measurements based on the noise level.

7. The method of claim 4, the method further comprising:
providing to the at least one software agent an extent of processing based on the physical measurements received.

8. The method of claim 7, wherein the extent of processing is based on the noise level.

9. The method of claim 1, the method further comprising:
deriving, from the physical measurement acquired by the at least one software agent, an estimate of a drilling parameter based on a formulation applicable to the drilling site; and
forwarding the estimate to the second computer system for display at a visual display.

10. The method of claim 9, wherein forwarding the estimate comprises:
forwarding the estimate to the at least one software agent for displaying a trend of one or more drilling parameters at the visual display.

11. The method of claim 9, wherein forwarding the estimate comprises:
forwarding the estimate to the at least one software agent for determining a current drilling recommendation.

12. The method of claim 1,
wherein modifying the at least one software agent comprises:
creating at least one new software agent having the one or more new formulations; and
forwarding the at least one new software agent to the second computer system to replace the at least one software agent.

13. The method of claim 1,
wherein modifying the at least one software agent comprises:
modifying, remotely by the first computer system, the one or more formulations.

14. The method of claim 1, the method further comprising:
storing the the physical measurements in a database at the first computer system.

15. The method of claim 14, the method further comprising:
determining, from the physical measurements, a change in a drilling state at the drilling site, wherein the at least one software agent is modified in response to the change in the drilling state.

16. The method of claim 15, wherein the one or more new formulations are associated with the change in the drilling state.

17. The method of claim 1, wherein the one or more software agents operate in a network of persistent, autonomous, goal-directed, sociable, reactive, non-prescriptive, adaptive, heuristic, distributed, mobile and self-organizing agents for providing recommendations toward drilling optimization.

18. The method of claim 1, the method further comprising:
devising the one or more formulations based on one or more of a database of sensed physical measurements, a database of well properties, drilling hardware types, and a knowledge base of previously generated formulations.

19. The method of claim 18, the method further comprising:
receiving inputs from a user regarding the drilling conditions at the drilling site, wherein devising uses the inputs in combination with one or more of the database of sensed physical measurements, the database of well properties, drilling hardware types, and the knowledge base of previously generated formulations.

20. The method of claim 19, wherein the inputs from comprise an input indicating a decision to ignore a current drilling recommendation.

21. The method of claim 18, the method further comprising:
storing the one or more formulations in the knowledge base.

22. The method of claim 18, wherein identifying the one or more new formulations comprises:
devising the one or more new formulations using the physical measurements in combination with one or more of the database of sensed physical measurements, the database of well properties, drilling hardware types, and the knowledge base of previously generated formulations.

23. The method of claim 18, the method further comprising:
receiving, from a user, a verification or non-verification of the one or more formulations.

24. The method of claim 1, the method further comprising:
devising the one or more formulations based on a best well ontology, the best well ontology comprising encapsulated formulations of steps to be taken to drill a best well corresponding to the drilling conditions.

25. The method of claim 24, the method further comprising:
modifying the encapsulated formulations corresponding to the best well ontology based on the physical measurements.

26. The method of claim 24, wherein devising the one or more formulations comprises:
utilizing a lithology model associated with the at least one of a parameter indicative of a layer of the earth in which the drilling occurs.

27. The method of claim 26, wherein the lithology model represents a plurality of layers in the earth in which the drilling occurs by way of metalayer representations, and wherein the metalayer representations comprise information regarding material properties of a given layer, values indicating a top depth and a bottom depth of the layer at the drilling location, and information regarding a method of drilling through a given layer.

28. The method of claim 1, wherein the at least one software agent is configured to utilize the one or more formulations to detect a presence or absence of a drilling dysfunction based on the physical measurements and is configured to displays a recommendation for improving drilling efficiency.

29. The method of claim 28, wherein the recommendation includes increasing a weight-on-bit and increasing revolutions per minute of a drill string.

30. The method of claim 28, wherein the at least one software agent is configured to execute on the second computer system and display the recommendation without human input.

31. The method of claim 28, wherein the at least one software agent is configured to display, responsive to detecting the presence of the drilling dysfunction, a first recommendation for resolving the drilling dysfunction.

32. The method of claim 31, wherein the at least one software agent is configured to display, responsive to detecting the presence of the drilling dysfunction, a second recommendation for resolving the drilling dysfunction.

33. The method of claim 32, wherein the at least one software agent is configured to display drilling recommendations until detecting the absence of the drilling dysfunction.

34. The method of claim 1, wherein the at least one software agent is configured to utilize the one or more formulations to detect a presence of a loss of circulation event based on the physical measurements and is configured to display a first recommendation for resolving the loss of circulation event.

35. The method of claim 34, wherein detecting the presence of a loss of circulation event comprises: evaluating a fluid loss model at a current depth of drilling, to return a maximum limit on expected fluid loss; estimating a current fluid loss in the drilling; responsive to the estimated current fluid loss exceeding the maximum limit; and indicating the presence of the loss of circulation event.

36. The method of claim 34, wherein the at least one software agent is configured to display, responsive to detecting the presence of the loss of circulation event, a second recommendation for resolving the loss of circulation event.

37. The method of claim 36, wherein the at least one software agent is configured to display recommendations until detecting an absence of the loss of circulation event.

38. A system for assisting drilling of a borehole at a drilling site, comprising:
a memory storing instructions; and
a processor configured to execute the instructions to perform a method comprising:
identifying drilling conditions at the drilling site, the drilling conditions comprising at least one of a parameter indicative of a layer of the earth in which the drilling occurs and a parameter indicative of at least one item of drilling equipment used in the drilling;
identifying at least one software agent having one or more formulations applicable to the drilling conditions at the drilling site, wherein the at least one software agent is configured to utilize the one or more formulations to perform at least one of acquiring physical measurements during the drilling at the drilling site forwarding the physical measurement; and providing a drilling recommendation at the drilling site;
forwarding the at least one software agent to a computer system at the drilling site, wherein the at least one software agent is configured to execute on the computer system;
receiving the physical measurements acquired by the at least one software agent executing on the computer system;
identifying one or more new formulations based on the physical measurements received from the at least one software agent; and
modifying the at least one software agent to include the one or more new formulations.

39. The system of claim 38, further comprising:
deriving the one or more formulations based on the drilling conditions at the drilling site.

40. The system of claim 38, wherein the at least one software agent is configured to utilize the one or more formulations to identify a drilling state in response to the physical measurements acquired by the at least one software agent.

41. The system of claim 38, the method further comprising:
receiving, from a user, a verification or non-verification of the one or more formulations.

42. The system of claim 38, the method further comprising:
receiving a decision to ignore at least one drilling recommendation provided by the at least one software agent; and
modifying at least one of the one or more formulations based on the decision to ignore the at least one drilling recommendation.

43. The system of claim 38, the method further comprising:
deriving the one or more formulations based on a best well ontology comprising encapsulated formulations of steps to be taken to drill an optimum well, at the drilling site, corresponding to the drilling conditions.

44. The system of claim 43, the method further comprising:
modifying the encapsulated formulations corresponding to the best well ontology based on the physical measurements.

45. The system of claim 43, wherein the one or more formulations comprises: utilizing a lithology model associated with the at least one of a parameter indicative of a layer of the earth in which the drilling occurs.

46. The system of claim 45, wherein wherein the lithology model represents a plurality of layers in the earth in which the drilling occurs by way of metalayer representations, and wherein the metalayer representations comprise information regarding material properties of a given layer, values indicating a top depth and a bottom depth of the layer at the drilling location, and information regarding a method of drilling through a given layer.

47. The system of claim 38, wherein the at least one software agent is configured to process the physical measurements depending on a noise level within the physical measurements.

48. The system of claim 38, the method further comprising:
deriving, from the physical measurement acquired by the at least one software agent, an estimate of a drilling parameter based on a formulation applicable to the drilling site; and
forwarding the estimate to the computer system for display at a visual display.

49. The system of claim 38, the method further comprising:
devising the one or more formulations based on one or more of a database of sensed physical measurements, a database of well properties, drilling hardware types, and a knowledge base of previously generated formulations.

50. The system of claim 49, the method further comprising:
receiving inputs from a user regarding the drilling conditions at the drilling site, wherein devising uses the inputs in combination with one or more of the database of sensed physical measurements, the database of well properties, drilling hardware types, and the knowledge base of previously generated formulations.

51. The system of claim 38, wherein the at least one software agent forms a network of persistent, autonomous, goal-directed, sociable, reactive, non-prescriptive, adaptive, heuristic, distributed, mobile and self-organizing agents for providing recommendations toward drilling optimization.

52. The system of claim 38, wherein modifying the at least one software agent comprises:
creating at least one new software agent having the one or more new formulations; and
forwarding the at least one new software agent to the second computer system to replace the at least one software agent.

53. The system of claim 38, wherein modifying the at least one software agent comprises:
modifying, remotely by the first computer system, the one or more formulations.

54. The system of claim 38, wherein the at least one software agent is configured to utilize the one or more formulations to detect a presence or absence of a drilling dysfunction based on the physical measurements and is configured to displays a recommendation for improving drilling efficiency.

55. The system of claim 54, wherein the at least one software agent is configured to execute on the second computer system and display the recommendation without human input.

56. The system of claim 54, wherein the recommendation includes increasing a weight-on-bit and increasing revolutions per minute of a drill string.

57. The system of claim 54, wherein the at least one software agent is configured to display, responsive to detecting the presence of the drilling dysfunction, a first recommendation for resolving the drilling dysfunction.

58. The system of claim 57, wherein the at least one software agent is configured to display, responsive to detecting the presence of the drilling dysfunction, a second recommendation for resolving the drilling dysfunction.

59. The system of claim 38, wherein wherein the at least one software agent is configured to utilize the one or more formulations to detect a presence of a loss of circulation event based on the physical measurements and is configured to display a first recommendation for resolving the loss of circulation event.

60. The system of claim 59, wherein wherein the at least one software agent is configured to display, responsive to detecting the presence of the loss of circulation event, a second recommendation for resolving the loss of circulation event.

61. The system of claim 59, wherein detecting the presence of a loss of circulation event comprises: evaluating a fluid loss model at a current depth of drilling, to return a maximum limit on expected fluid loss; estimating a current fluid loss in the drilling; responsive to the estimated current fluid loss exceeding the maximum limit; and indicating the presence of the loss of circulation event.

62. A non-transitory computer readable medium encoded with instructions that executable by one or more computers to perform a method comprising:
identifying, at a first computer system, drilling conditions at the drilling site, the drilling conditions comprising at least one of a parameter indicative of a layer of the earth in which the drilling occurs and a parameter indicative of at least one item of drilling equipment used in the drilling;
identifying, at the first computer system, at least one software agent having one or more formulations applicable to the drilling conditions at the drilling site, wherein the at least one software agent is configured to utilize the one or more formulations to perform at least one of acquiring physical measurements during the drilling at the drilling site; forwarding the physical measurement to the first computer system; and providing a drilling recommendation at the drilling site;
forwarding, by the first computer system, the at least one software agent to the second computer system at the drilling site, wherein the at least one software agent is configured to execute on the second computer system;
receiving, at the first computer system, the physical measurements acquired by the at least one software agent executing on the second computer system;
identifying one or more new formulations based on the physical measurements received from the at least one software agent; and
modifying, by the first computer system, the at least one software agent to include the one or more new formulations.

63. The non-transitory computer readable medium of claim 62,
wherein the at least one software agent is configured to process the physical measurements depending on a noise level within the physical measurements.

64. The non-transitory computer readable medium of claim 62, the method further comprising:
deriving, from the physical measurement acquired by the at least one software agent, an estimate of a drilling parameter based on a formulation applicable to the drilling site; and
forwarding the estimate to the second computer system for display at a visual display.

65. The non-transitory computer readable medium of claim 62, wherein modifying the at least one software agent comprises:
creating at least one new software agent having the one or more new formulations; and
forwarding the at least one new software agent to the second computer system to replace the at least one software agent.

66. The non-transitory computer readable medium of claim 62, wherein modifying the at least one software agent comprises:
modifying, remotely by the first computer system, the one or more formulations.

67. The non-transitory computer readable medium of claim 62, wherein the at least one software agent is configured to utilize the one or more formulations to identify a drilling state in response to the physical measurements acquired by the at least one software agent.

68. The non-transitory computer readable medium of claim 62, the method further comprising:
devising the one or more formulations based on one or more of a database of sensed physical measurements, a database of well properties, drilling hardware types, and a knowledge base of previously generated formulations.

69. The non-transitory computer readable medium of claim 68, the method further comprising:
receiving inputs from a user regarding the drilling conditions at the drilling site, wherein devising uses the inputs in combination with one or more of the database of sensed physical measurements, the database of well properties, drilling hardware types, and the knowledge base of previously generated formulations.

70. The non-transitory computer readable medium of claim 62, the method further comprising:
devising the one or more formulations based on a best well ontology, the best well ontology comprising encapsulated formulations of steps to be taken to drill a best well corresponding to the drilling conditions.

71. The non-transitory computer readable medium of claim 70, the method further comprising:
modifying the encapsulated formulations corresponding to the best well ontology based on the physical measurements.

72. The non-transitory computer readable medium of claim 62, wherein the at least one software agent is configured to utilize the one or more formulations to detect a presence or absence of a drilling dysfunction based on the physical measurements and is configured to displays a recommendation for improving drilling efficiency.

73. The non-transitory computer readable medium of claim 72, wherein the recommendation includes increasing a weight-on-bit and increasing revolutions per minute of a drill string.

74. The non-transitory computer readable medium of claim 72, wherein the at least one software agent is configured to execute on the second computer system and display the recommendation without human input.

75. The non-transitory computer readable medium of claim 72, wherein the at least one software agent is configured to display, responsive to detecting the presence of the drilling dysfunction, a first recommendation for resolving the drilling dysfunction.

76. The non-transitory computer readable medium of claim 75, wherein wherein the at least one software agent is configured to display, responsive to detecting the presence of the drilling dysfunction, a second recommendation for resolving the drilling dysfunction.

77. The non-transitory computer readable medium of claim 76, wherein wherein the at least one software agent is configured to display drilling recommendations until detecting the absence of the drilling dysfunction.

78. The non-transitory computer readable medium of claim 62, wherein wherein the at least one software agent is configured to utilize the one or more formulations to detect a presence of a loss of circulation event based on the physical measurements and is configured to display a first recommendation for resolving the loss of circulation event.

79. The non-transitory computer readable medium of claim 78, wherein detecting the presence of a loss of circulation event comprises: evaluating a fluid loss model at a current depth of drilling, to return a maximum limit on expected fluid loss; estimating a current fluid loss in the drilling; responsive to the estimated current fluid loss exceeding the maximum limit; and indicating the presence of the loss of circulation event.

80. The non-transitory computer readable medium of claim 78, wherein the at least one software agent is configured to display, responsive to detecting the presence of the loss of circulation event, a second recommendation for resolving the loss of circulation event.

81. The non-transitory computer readable medium of claim 80, wherein the at least one software agent is configured to display recommendations until detecting an absence of the loss of circulation event.

* * * * *